United States Patent
Gassend et al.

(10) Patent No.: US 11,789,123 B2
(45) Date of Patent: *Oct. 17, 2023

(54) BEAM HOMOGENIZATION FOR OCCLUSION RESISTANCE

(71) Applicant: Waymo LLC, Mountain View, CA (US)

(72) Inventors: Blaise Gassend, East Palo Alto, CA (US); Ralph H. Shepard, Menlo Park, CA (US); Jason Watson, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,611

(22) Filed: Nov. 11, 2022

(65) Prior Publication Data

US 2023/0076303 A1    Mar. 9, 2023

Related U.S. Application Data

(63) Continuation of application No. 16/456,508, filed on Jun. 28, 2019, now Pat. No. 11,525,892.

(51) Int. Cl.
   *G01S 7/481*      (2006.01)
   *G02B 27/30*      (2006.01)
   (Continued)

(52) U.S. Cl.
   CPC .......... *G01S 7/4811* (2013.01); *G01S 7/4815* (2013.01); *G01S 17/10* (2013.01); *G02B 5/0252* (2013.01);
   (Continued)

(58) Field of Classification Search
   CPC ...... G01S 7/4811; G01S 7/4815; G01S 17/00; G01S 17/02; G01S 17/10; G02B 27/30
   See application file for complete search history.

(56) References Cited

U.S. PATENT DOCUMENTS

| 9,086,273 B1 | 7/2015 | Gruver et al. |
| 9,270,085 B1 | 2/2016 | Kanskar |

(Continued)

FOREIGN PATENT DOCUMENTS

| JP | H07-306260 A | 11/1995 |
| JP | H08015412 A | 1/1996 |

(Continued)

OTHER PUBLICATIONS

International Search Report and Written Opinion, dated Aug. 12, 2020, in International Patent Application No. PCT/US2020/029260.

*Primary Examiner* — Ryan D Howard
(74) *Attorney, Agent, or Firm* — McDonnell Boehnen Hulbert & Berghoff LLP

(57) ABSTRACT

Example embodiments relate to beam homogenization for occlusion avoidance. One embodiment includes a light detection and ranging (LIDAR) device. The LIDAR device includes a transmitter and a receiver. The transmitter includes a light emitter. The light emitter emits light that diverges along a fast-axis and a slow-axis. The transmitter also includes a fast-axis collimation (FAC) lens optically coupled to the light emitter. The FAC lens is configured to receive light emitted by the light emitter and reduce a divergence of the received light along the fast-axis of the light emitter to provide reduced-divergence light. The transmitter further includes a transmit lens optically coupled to the FAC lens. The transmit lens is configured to receive the reduced-divergence light from the FAC lens and provide transmit light. The FAC lens is positioned relative to the light emitter such that the reduced-divergence light is expanded at the transmit lens.

20 Claims, 14 Drawing Sheets

(51) Int. Cl.
  *G02B 26/12*  (2006.01)
  *G01S 17/10*  (2020.01)
  *G02B 5/02*  (2006.01)

(52) U.S. Cl.
  CPC .......... *G02B 5/0278* (2013.01); *G02B 26/12* (2013.01); *G02B 27/30* (2013.01)

(56) References Cited

U.S. PATENT DOCUMENTS

| | | |
|---|---|---|
| 9,343,868 B2 | 5/2016 | Sipes, Jr. et al. |
| 11,525,892 B2 * | 12/2022 | Gassend ............ G02B 27/0911 |
| 2006/0045144 A1 | 3/2006 | Karlsen et al. |
| 2018/0143309 A1 | 5/2018 | Pennecot et al. |
| 2018/0172804 A1 | 6/2018 | Gassend et al. |
| 2018/0188355 A1 | 7/2018 | Bao et al. |
| 2018/0267152 A1 | 9/2018 | McMichael et al. |
| 2018/0299548 A1 | 10/2018 | Noguchi et al. |
| 2018/0329061 A1 | 11/2018 | Pacala et al. |

FOREIGN PATENT DOCUMENTS

| | | |
|---|---|---|
| JP | H11064518 A | 3/1999 |
| JP | 2004271404 A | 9/2004 |
| JP | 2005-505772 A | 2/2005 |
| JP | 2012-225821 A | 11/2012 |
| JP | 2016534346 A | 11/2016 |
| KR | 10-1868293 B1 | 7/2018 |
| WO | 2017183530 A1 | 10/2017 |
| WO | 2019012086 A1 | 1/2019 |
| WO | 2019/113368 A1 | 6/2019 |

* cited by examiner

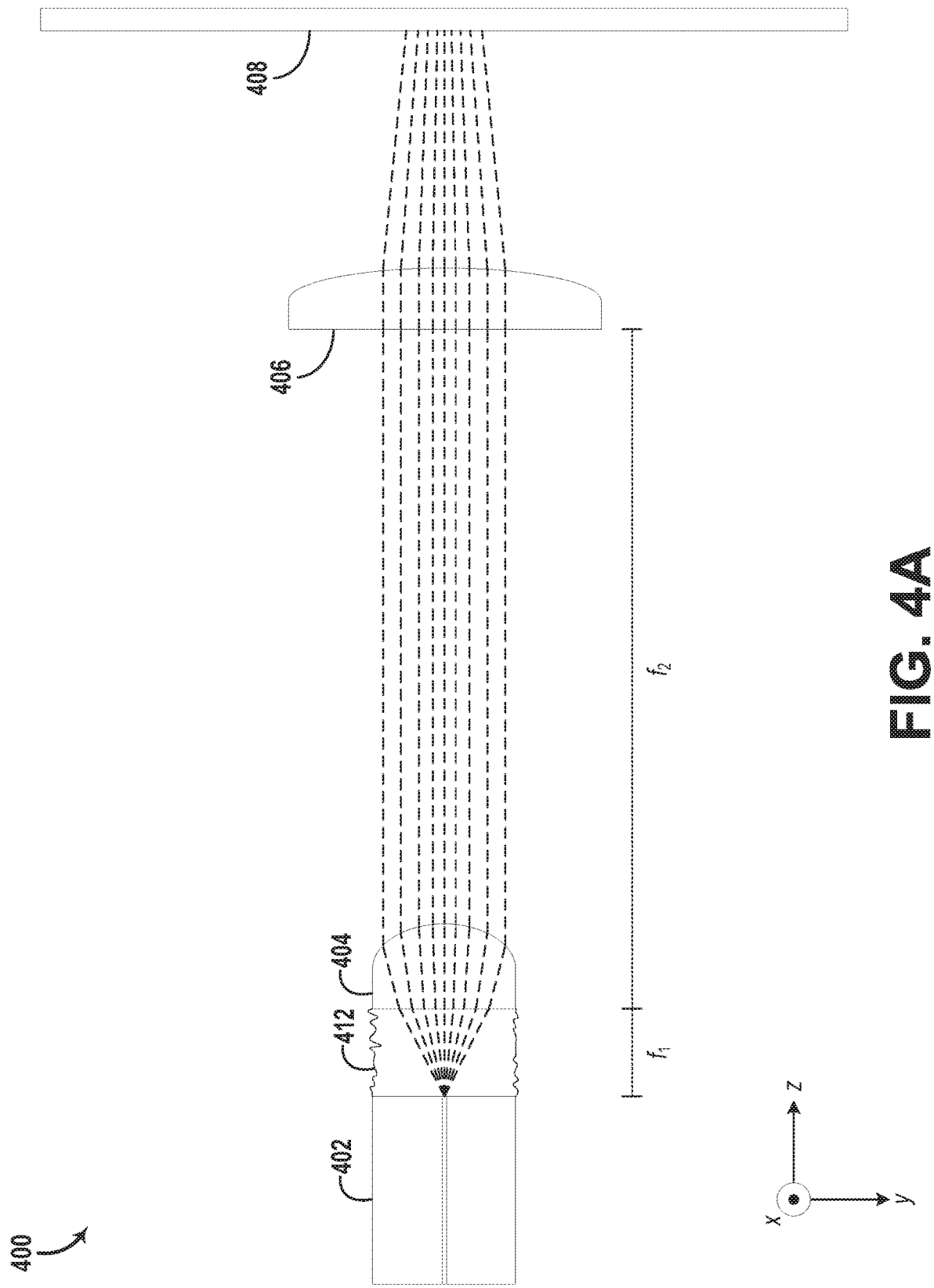

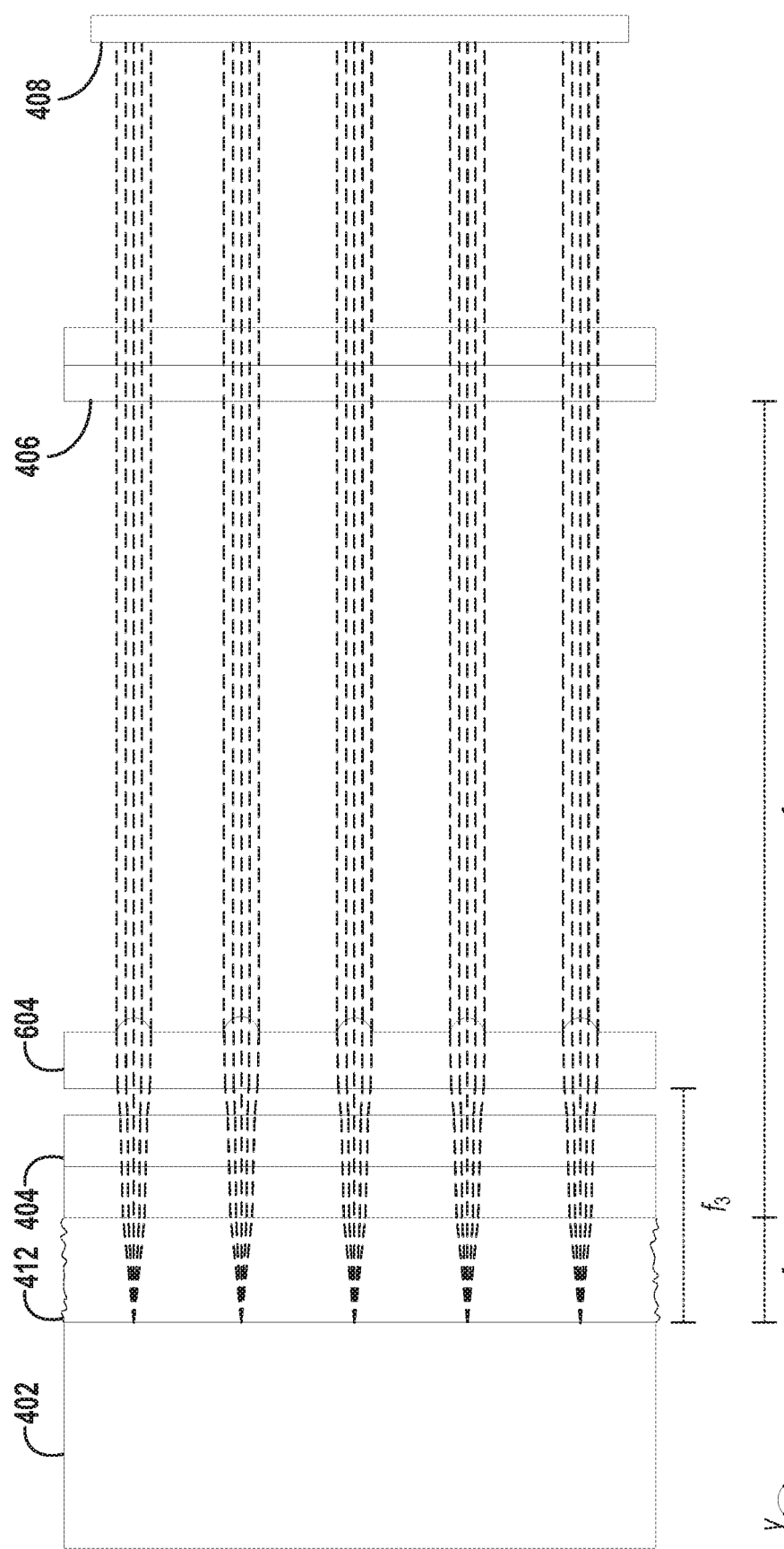

BEAM HOMOGENIZATION FOR OCCLUSION RESISTANCE

CROSS-REFERENCE TO RELATED APPLICATIONS

This application is a continuation of U.S. patent application Ser. No. 16/456,508, filed Jun. 28, 2019. The foregoing applications are incorporated herein by reference in their entireties.

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection or scattering) and detected by a detector subsystem. Conventional detector subsystems may include a plurality of detectors and a corresponding controller configured to determine an arrival time of the respective light pulses with high temporal resolution (e.g., ~400 ps). The distance between the LIDAR device and a given object may be determined based on a time of flight of the corresponding light pulses that interact with the given object.

SUMMARY

The disclosure relates to beam homogenization for occlusion resistance (e.g., within a LIDAR device). By adjusting the location of a lens (e.g., a fast-axis collimation (FAC) lens) relative to a light emitter (e.g., a laser diode or an array of laser diodes), the divergence of a transmitted light signal may be modified. Further, by increasing the divergence of the transmitted light signal, the beam width of the transmitted signal may be increased at an output window of the LIDAR device. The larger beam width can prevent debris or defects that may be present on the output window from occluding portions of the transmitted signal that would otherwise be occluded by the debris or defects.

In one aspect, a light detection and ranging (LIDAR) device is provided. The LIDAR device includes a transmitter. The transmitter includes a light emitter. The light emitter emits light that diverges along a fast-axis and a slow-axis. The transmitter also includes a fast-axis collimation (FAC) lens optically coupled to the light emitter. The FAC lens is configured to receive light emitted by the light emitter and reduce a divergence of the received light along the fast-axis of the light emitter to provide reduced-divergence light. The transmitter further includes a transmit lens optically coupled to the FAC lens. The transmit lens is configured to receive the reduced-divergence light from the FAC lens and provide transmit light. The FAC lens is positioned relative to the light emitter such that the reduced-divergence light is expanded at the transmit lens. The LIDAR device also includes a receiver. The receiver includes a receive lens. The receiver also includes a light sensor optically coupled to the receive lens. In addition, the LIDAR device includes a window that includes a material transparent to the transmit light. The window is optically coupled to the transmit lens and the receive lens such that (i) the transmit light from the transmit lens passes through the window into an environment of the LIDAR device and (ii) reflections of the transmit light from the environment pass through the window to the receive lens.

In another aspect, an autonomous vehicle is provided. The autonomous vehicle includes a light detection and ranging (LIDAR) device. The LIDAR device includes a transmitter. The transmitter includes a light emitter. The light emitter emits light that diverges along a fast-axis and a slow-axis. The transmitter also includes a fast-axis collimation (FAC) lens optically coupled to the light emitter. The FAC lens is configured to receive light emitted by the light emitter and reduce a divergence of the received light along the fast-axis of the light emitter to provide reduced-divergence light. The transmitter further includes a transmit lens optically coupled to the FAC lens. The transmit lens is configured to receive the reduced-divergence light from the FAC lens and provide transmit light. The FAC lens is positioned relative to the light emitter such that the reduced-divergence light is expanded at the transmit lens. The LIDAR device also includes a receiver. The receiver includes a receive lens. The receiver also includes a light sensor optically coupled to the receive lens. In addition, the LIDAR device includes a window that includes a material transparent to the transmit light. The window is optically coupled to the transmit lens and the receive lens such that (i) the transmit light from the transmit lens passes through the window into an environment of the LIDAR device and (ii) reflections of the transmit light from the environment pass through the window to the receive lens.

In an additional aspect, a method is provided. The method includes emitting, by a light emitter, a light signal that diverges along a fast-axis and a slow-axis. The method also includes receiving, by a fast-axis collimation (FAC) lens, the light signal from the light emitter. Further, the method includes reducing, by the FAC lens, a divergence of the received light signal along the fast-axis of the light emitter to provide reduced-divergence light. In addition, the method includes receiving, by a transmit lens, the reduced-divergence light. The reduced-divergence light is expanded at the transmit lens. Still further, the method includes providing, by the transmit lens, transmit light. Even further, the method includes providing the transmit light to an environment via a window that includes a material transparent to the transmit light. Yet further, the method includes receiving, by a receive lens via the window, reflections of the transmit light from the environment. Even still further, the method includes providing, by the receive lens, the received reflections to a light sensor. Still yet further, the method includes detecting, by the light sensor, the received reflections.

In yet another aspect, a transmitter of a light detection and ranging (LIDAR) device is provided. The transmitter includes a light emitter. The light emitter emits light that diverges along a fast-axis and a slow-axis. The transmitter also includes a fast-axis collimation (FAC) lens optically coupled to the light emitter. The FAC lens is configured to receive light emitted by the light emitter and reduce a divergence of the received light along the fast-axis of the light emitter to provide reduced-divergence light. The transmitter further includes a transmit lens optically coupled to the FAC lens. The transmit lens is configured to receive the reduced-divergence light from the FAC lens and provide transmit light that is transmitted to an environment of the LIDAR device through a window. The FAC lens is positioned relative to the light emitter such that the transmit light occupies a cross-sectional area at the window that is larger than an area occupied by an occlusion on the window. In some aspects, the cross-sectional area of the transmit light at the window is about 25 mm$^2$.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4A is an illustration of a partial cross-section of a LIDAR device, according to example embodiments.

FIG. 6 is an illustration of a partial cross-section of a LIDAR device, according to example embodiments.

DETAILED DESCRIPTION

Figure 1:
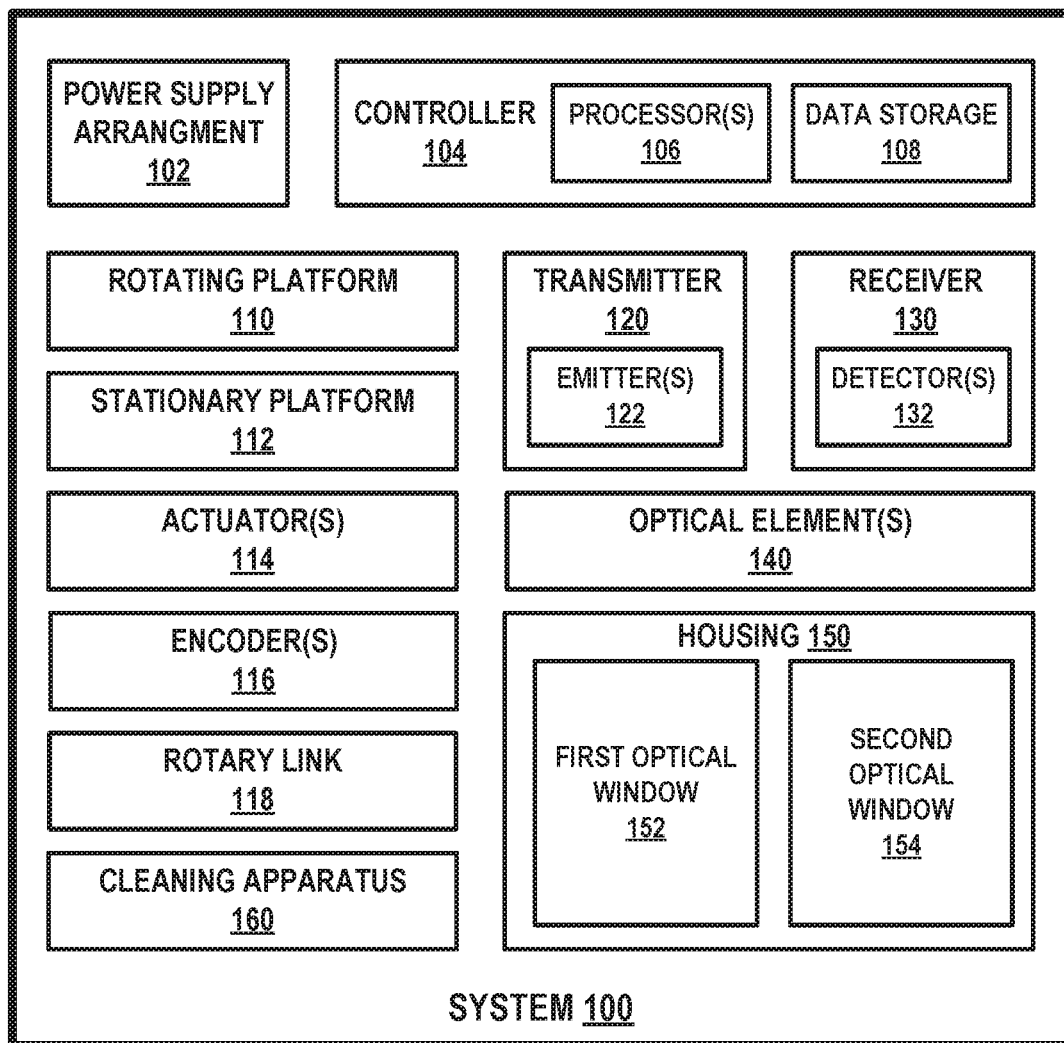
FIG. 1 is a simplified block diagram of a system, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

LIDAR devices may determine the range to a given object in a surrounding environment by determining the time of flight between a transmitted light signal and a detected reflection. The transmitted light signal may be emitted from a light emitter (e.g., a laser diode or an array of laser diodes). Prior to transmitting the light signal to the surrounding environment, the light signal may pass through one or more optics within the LIDAR device. For example, the light signal may be focused by one or more lenses, reflected by one or more mirrors, and/or transmitted out of the LIDAR device to the surrounding environment through a window.

If the light signal is transmitted to a surrounding environment through a window, debris on the window or defects of the window may interfere with the transmission of the light signal. For example, debris present on the window (e.g., dust, dirt, mud, snow, ice, rain, leaves, insects, condensation, smudges, moisture, fingerprints, etc.) or defects in the window itself (e.g., cracks, impurities leading to optical absorption, deformities, etc.) could redirect, block, attenuate, or otherwise interfere with the transmission of the light signal to the surrounding environment.

Embodiments described herein disclose techniques to avoid detrimental effects of such debris or defects on the light signal transmitted to the surrounding environment. For example, one embodiment herein includes a LIDAR device that includes a light emitter, an FAC lens, a transmit lens, and an optical window. Based on the position of the FAC lens relative to the light emitter, the beam divergence of the signal emitted by the light emitter along the fast axis can be set. The beam divergence along the fast axis may be set such that the light signal, after passing through the transmit lens, is spread across a substantial portion of the window. The portion of the window across which the light signal is spread (e.g., based on the beam diameter along a fast-axis at the window) may be larger than a portion of the window that is occluded by debris or affected by a defect in the window. For example, a portion of the window across which the light signal is spread (e.g., a 25 mm$^2$ portion) may be larger than the size of the debris or defect. As such, at least some portion of the transmitted light signal can propagate unaffectedly to the surrounding environment. Thus, even if debris or a defect is present, the light signal may nonetheless be used by the LIDAR device to determine distances to objects within the surrounding environment. Expanding the area over which the emitted signal is spread when transmitting the signal to the surrounding environment also reduces the intensity of the signal (e.g., in W/m$^2$) transmitted to the surrounding environment. By reducing the intensity of the signal transmitted to the surrounding environment, an eye safety factor of the LIDAR device may be further enhanced (i.e., the risk of eye damage can be further reduced beyond existing safety standards by having a signal with lower intensity).

The position of the FAC lens relative to the light emitter may be determined based on one or more of the following: the inherent divergence of the light emitted by the light emitter, the power of the light emitted by the light emitter, the back focal length of the FAC lens, the position of the transmit lens, the focal length of the transmit lens, the position of the window, the size of the window, and sizes or shapes of known or predicted defects of the window. A transparent epoxy layer may be used to adhere the FAC lens to the light emitter (e.g., with the transparent epoxy layer occupying the separation between the FAC lens and the light emitter). In addition to or instead of modifying the position of the FAC lens relative to the light emitter, a shape of the FAC lens may be modified to accomplish a similar objective (e.g., to modify a divergence profile of the emitted signal). Modifying the shape of the FAC lens may correspond to modifying the back focal length of the FAC lens, for example.

In addition to positioning the FAC lens to adjust the beam divergence, one or more optical elements (e.g., diffusive elements) may be positioned along the optical axis near the FAC lens to modify the divergence profile of the emitted signal. For example, the LIDAR device may include a diffuser (e.g., a holographic diffuser) positioned along the optical axis to further adjust the divergence profile of the emitted signal. Still further, in some embodiments, one or more slow-axis collimation (SAC) lenses may be positioned along the optical axis to modify the divergence profile of the emitted signal along a slow-axis, thereby further shaping the beam of the emitted signal at the window. Similar to the FAC lens, the position of the SAC lens relative to the light emitter may be determined based on one or more of the following: the inherent divergence of the light emitted by the light emitter, the power of the light emitted by the light emitter, the back focal length of the SAC lens, the position of the transmit lens, the focal length of the transmit lens, the position of the window, the size of the window, and sizes or shapes of known or predicted defects of the window.

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

A non-exhaustive list of example sensors of the present disclosure includes LIDAR sensors, radio detection and ranging (RADAR) sensors, sound navigation ranging (SONAR) sensors, active infrared (TR) cameras, and/or microwave cameras, among others. To that end, some example sensors herein may include active sensors that emit a signal (e.g., visible light signal, invisible light signal, radio-frequency signal, microwave signal, sound signal, etc.), and then detect reflections of the emitted signal from the surrounding environment.

FIG. 1 is a simplified block diagram of a system 100, according to example embodiments. As shown, system 100 includes a power supply arrangement 102, a controller 104, a rotating platform 110, a stationary platform 112, one or more actuators 114, one or more encoders 116, a rotary link 118, a transmitter 120, a receiver 130, one or more optical elements 140, a housing 150, and a cleaning apparatus 160. In some embodiments, system 100 may include more, fewer, or different components. Additionally, the components shown may be combined or divided in any number of ways.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of the system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 118.

In some examples, controller 104 may include or otherwise be coupled to wiring used for transfer of control signals to various components of system 100 and/or for transfer of data from various components of system 100 to controller 104. For example, the data that controller 104 receives may include sensor data indicating detections of signals by receiver 130, among other possibilities. Moreover, the control signals sent by controller 104 may operate various components of system 100, such as by controlling emission of signals by transmitter 120, controlling detection of signals by the receiver 130, and/or controlling actuator(s) 114 to rotate rotating platform 110, among other possibilities.

As shown, controller 104 may include one or more processors 106 and data storage 108. In some examples, data storage 108 may store program instructions executable by processor(s) 106 to cause system 100 to perform the various operations described herein. To that end, processor(s) 106 may comprise one or more general-purpose processors and/or one or more special-purpose processors. To the extent that controller 104 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 104 may communicate with an external controller or the like (e.g., a computing system arranged in a vehicle to which system 100 is mounted) so as to help facilitate transfer of control signals and/or data between the external controller and the various components of system 100. Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 120. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 114 to cause the rotating platform to rotate at a particular frequency or phase. Other examples are possible as well.

Rotating platform 110 may be configured to rotate about an axis. To that end, rotating platform 110 can be formed from any solid material suitable for supporting one or more components mounted thereon. For example, transmitter 120 and receiver 130 may be arranged on rotating platform 110 such that each of these components moves relative to the environment based on rotation of rotating platform 110. In particular, these components could be rotated about an axis so that system 100 may obtain information from various directions. For instance, where the axis of rotation is a vertical axis, a pointing direction of system 100 can be adjusted horizontally by actuating the rotating platform 110 about the vertical axis.

Stationary platform 112 may take on any shape or form and may be configured for coupling to various structures, such as to a top of a vehicle, a robotic platform, assembly line machine, or any other system that employs system 100 to scan its surrounding environment, for example. Also, the coupling of the stationary platform may be carried out via any feasible connector arrangement (e.g., bolts, screws, etc.).

Actuator(s) 114 may include motors, pneumatic actuators, hydraulic pistons, and/or piezoelectric actuators, and/or any other types of actuators. In one example, actuator(s) 114 may include a first actuator configured to actuate the rotating platform 110 about the axis of rotation of rotating platform 110. In another example, actuator(s) 114 may include a second actuator configured to rotate one or more components of system 100 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 114 may include a third actuator configured to tilt (or otherwise move) one or more components of system 100. For instance, the third actuator can be used to move or replace a filter or other type of optical element 140 along an optical path of an emitted light pulse, or can be used to tilt the rotating platform (e.g., to adjust the extents of a field-of-view (FOV) scanned by system 100, etc.), among other possibilities.

Encoder(s) 116 may include any type of encoder (e.g., mechanical encoders, optical encoders, magnetic encoders, capacitive encoders, etc.). In general, encoder(s) 116 may be configured to provide rotational position measurements of a device that rotates about an axis. In one example, encoder(s) 116 may include a first encoder coupled to rotating platform 110 to measure rotational positions of platform 110 about an axis of rotation of platform 110. In another example, encoder(s) 116 may include a second encoder coupled to a mirror (or other optical element 140) to measure rotational positions of the mirror about an axis of rotation of the mirror.

Rotary link 118 directly or indirectly couples stationary platform 112 to rotating platform 110. To that end, rotary link 118 may take on any shape, form, and material that provides for rotation of rotating platform 110 about an axis relative to the stationary platform 112. For instance, rotary link 118 may take the form of a shaft or the like that rotates based on actuation from actuator(s) 114, thereby transferring mechanical forces from actuator(s) 114 to rotating platform 110. In one implementation, rotary link 118 may have a central cavity in which one or more components of system 100 may be disposed. In some examples, rotary link 118 may also provide a communication link for transferring data and/or instructions between stationary platform 112 and rotating platform 110 (and/or components thereon such as transmitter 120 and receiver 130).

Transmitter 120 may be configured to transmit signals toward an environment of system 100. As shown, transmitter 120 may include one or more emitters 122. Emitters 122 may include various types of emitters depending on a configuration of system 100.

In a first example, where system 100 is configured as a LIDAR device, transmitter 120 may include one or more light emitters 122 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 122 includes laser diodes, arrays of laser diode, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), fiber lasers, and/or any other device configured to selectively transmit, reflect, and/or emit light to provide a plurality of emitted light beams and/or pulses.

In a second example, where system 100 is configured as an active IR camera, transmitter 120 may include one or more emitters 122 configured to emit IR radiation to illuminate a scene. To that end, transmitter 120 may include any type of emitter (e.g., light source, etc.) configured to provide the IR radiation.

In a third example, where system 100 is configured as a RADAR device, transmitter 120 may include one or more antennas, waveguides, and/or other type of RADAR signal emitters 122 that are configured to emit and/or direct modulated radio-frequency (RF) signals toward an environment of system 100.

In a fourth example, where system 100 is configured as a SONAR device, transmitter 120 may include one or more acoustic transducers, such as piezoelectric transducers, magnetostrictive transducers, electrostatic transducers, and/or other types of SONAR signal emitters 122 that are configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

In some implementations, system 100 (and/or transmitter 120) can be configured to emit a plurality of signals (e.g., light beams, IR signals, RF waves, sound waves, etc.) in a relative spatial arrangement that defines a FOV of system 100. For example, each beam (or signal) may be configured to propagate toward a portion of the FOV. In this example, multiple adjacent (and/or partially overlapping) beams may be directed to scan multiple respective portions of the FOV during a scan operation performed by system 100. Other examples are possible as well.

Receiver 130 may include one or more detectors 132 configured to detect reflections of the signals emitted by transmitter 120.

In a first example, where system 100 is configured as a RADAR device, receiver 130 may include one or more antennas (i.e., detectors 132) configured to detect reflections of the RF signal transmitted by transmitter 120. To that end, in some implementations, the one or more antennas of transmitter 120 and receiver 130 can be physically implemented as the same physical antenna structures.

In a second example, where system 100 is configured as a SONAR device, receiver 130 may include one or more sound sensors 110 (e.g., microphones, etc.) that are configured to detect reflections of the sound signals emitted by transmitter 120.

In a third example, where system 100 is configured as an active IR camera, receiver 130 may include one or more light detectors 132 (e.g., charge-coupled devices (CCDs), etc.) that are configured to detect a source wavelength of IR light transmitted by transmitter 120 and reflected off a scene toward receiver 130.

In a fourth example, where system 100 is configured as a LIDAR device, receiver 130 may include one or more light detectors 132 arranged to intercept and detect reflections of the light pulses or beams emitted by transmitter 120 that return to system 100 from the environment. Example light detectors 132 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APSs), charge coupled devices (CCDs), cryogenic detectors, and/or any other sensor of light. In some instances, receiver 130 may be configured to detect light having wavelengths in the same wavelength range as the light emitted by transmitter 120. In this way, for instance, system 100 may distinguish received light originated by system 100 from other light originated by external sources in the environment.

In some implementations, receiver 130 may include a detector comprising an array of sensing elements connected to one another. For instance, where system 100 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety ways. For instance, the individual detectors of the array can be disposed on one or more substrates (e.g., printed circuit boards (PCBs), flexible PCBs, etc.) and arranged to detect incoming light that is traveling along an optical path of an optical lens of system 100 (e.g., optical element(s) 140). Also, such a photodetector array could include any feasible number of detectors arranged in any feasible manner.

In some examples, system 100 can select or adjust a horizontal scanning resolution by changing a rate of rotation of system 100 (and/or transmitter 120 and receiver 130). Additionally or alternatively, the horizontal scanning resolution can be modified by adjusting a pulse rate of signals emitted by transmitter 120. In a first example, transmitter 120 may be configured to emit pulses at a pulse rate of 15,650 pulses per second, and to rotate at 10 Hz (i.e., ten complete 360° rotations per second) while emitting the pulses. In this example, receiver 130 may have a 0.23° horizontal angular resolution (e.g., horizontal angular separation between consecutive pulses). In a second example, if system 100 is instead rotated at 20 Hz while maintaining the pulse rate of 15,650 pulses per second, then the horizontal angular resolution may become 0.46°. In a third example, if transmitter 120 emits the pulses at a rate of 31,300 pulses per second while maintaining the rate of rotation of 10 Hz, then the horizontal angular resolution may become 0.115°. In some examples, system 100 can be alternatively configured to scan a particular range of views within less than a complete 360° rotation of system 100. Other implementations are possible as well.

It is noted that the pulse rates, angular resolutions, rates of rotation, and viewing ranges described above are only for the sake of example, and thus each of these scanning characteristics could vary according to various applications of system 100.

Optical element(s) 140 can be optionally included in or otherwise coupled to transmitter 120 and/or receiver 130. In one example, optical element(s) 140 can be arranged to direct light emitted by emitter(s) 122 toward a scene (or a region therein). In another example, optical element(s) 140 can be arranged to focus light from the scene (or a region therein) toward detector(s) 132. As such, optical element(s) 140 may include any feasible combination of optical elements, such as filters, apertures, mirror(s), waveguide(s), lens(es), or other types of optical components, that are arranged to guide propagation of light through physical space and/or to adjust a characteristic of the light.

In some examples, controller 104 could operate actuator 114 to rotate rotating platform 110 in various ways so as to obtain information about the environment. In one example, rotating platform 110 could be rotated in either direction. In another example, rotating platform 110 may carry out complete revolutions such that system 100 scans a 3600 view of the environment. Moreover, rotating platform 110 could rotate at various frequencies so as to cause system 100 to scan the environment at various refresh rates. In one embodiment, system 100 may be configured to have a refresh rate of 10 Hz (e.g., ten complete rotations of system 100 per second). Other refresh rates are possible.

Alternatively or additionally, system 100 may be configured to adjust the pointing direction of an emitted signal (emitted by transmitter 120) in various ways. In one implementation, signal emitters (e.g., light sources, antennas, acoustic transducers, etc.) of transmitter 120 can be operated according to a phased array configuration or other type of beam steering configuration.

In a first example, where system 100 is configured as a LIDAR device, light sources or emitters in transmitter 120 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where system 100 is configured as a RADAR device, transmitter 120 may include an array of antennas, and controller 104 can provide respective phase-shifted control signals for each individual antenna in the array to modify a pointing direction of a combined RF signal from the array (e.g., phased array beam steering).

In a third example, where system 100 is configured as a SONAR device, transmitter 120 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if rotating platform 110 is not rotating, etc.).

Housing 150 may take on any shape, form, and material and may be configured to house one or more components of system 100. In one example, housing 150 can be a dome-shaped housing. Further, in some examples, housing 150 may be composed of or may include a material that is at least partially non-transparent, which may allow for blocking of at least some signals from entering the interior space of the housing 150 and thus help mitigate thermal and noise effects of ambient signals on one or more components of system 100. Other configurations of housing 150 are possible as well.

In some examples, housing 150 may be coupled to rotating platform 110 such that housing 150 is configured to rotate based on rotation of rotating platform 110. In these examples, transmitter 120, receiver 130, and possibly other components of system 100 may each be disposed within housing 150. In this manner, transmitter 120 and receiver 130 may rotate along with housing 150 while being disposed within housing 150. In other examples, housing 150 may be coupled to stationary platform 112 or other structure such that housing 150 does not rotate with the other components rotated by rotating platform 110.

As shown, housing 150 can optionally include a first optical window 152 and a second optical window 154. Thus, in some examples, housing 150 may define an optical cavity in which one or more components disposed inside the housing (e.g., transmitter 120, receiver 130, etc.) are optically isolated from external light in the environment, except for light that propagates through optical windows 152 and

154. With this arrangement for instance, system 100 (e.g., in a LIDAR configuration, etc.) may reduce interference from external light (e.g., noise, etc.) with signals transmitted by transmitter 120 and/or reflections of the transmitted signal received by receiver 130.

To that end, in some embodiments, optical windows 152 and 154 may include a material that is transparent to the wavelengths of light emitted by emitters 122 and/or one or more other wavelengths. For example, each of optical windows 152 and 154 may be formed from a glass substrate, or a plastic substrate, among others. Additionally, in some examples, each of optical windows 152 and 154 may include or may be coupled to a filter that selectively transmits wavelengths of light transmitted by emitter(s) 122, while reducing transmission of other wavelengths. Optical windows 152 and 154 may have various thicknesses. In one embodiment, optical windows 152 and 154 may have a thickness between 1 millimeter and 2 millimeters. Other thicknesses are possible as well.

In some examples, second optical window 154 may be located at an opposite side of housing 150 from first optical window 152.

Cleaning apparatus 160 can be optionally included in system 100 to facilitate cleaning one or more components (e.g., optical element(s) 140, etc.) of system 100. To that end, cleaning apparatus 160 may include one or more cleaning mechanisms. In a first example, cleaning apparatus 160 may include a liquid spray configured to deposit liquid on one or more components of system 100 (e.g., optical element(s) 140, housing 150, etc.). For instance, the liquid can be applied to attempt to dissolve or mechanically remove an occlusion (e.g., dirt, dust, condensation, moisture, leaves, or other debris) disposed on a surface of an optical component. In a second example, cleaning apparatus 160 may include a high-pressure gas pump configured to apply gas onto an occlusion on a surface of an optical component. In a third example, cleaning apparatus 10 may include a wiper (e.g., similar to a windshield wiper) configured to attempt to remove an occlusion from a surface of a component in system 100.

It is noted that this arrangement of system 100 is described for example purposes only and is not meant to be limiting. As noted above, in some examples, system 100 can be alternatively implemented with fewer components than those shown. In one example, system 100 can be implemented without rotating platform 110. For instance, transmitter 120 can be configured to transmit a plurality of signals spatially arranged to define a particular FOV of system 100 (e.g., horizontally and vertically) without necessarily rotating transmitter 120 and receiver 130. Other examples are possible as well.

Figure 2A:
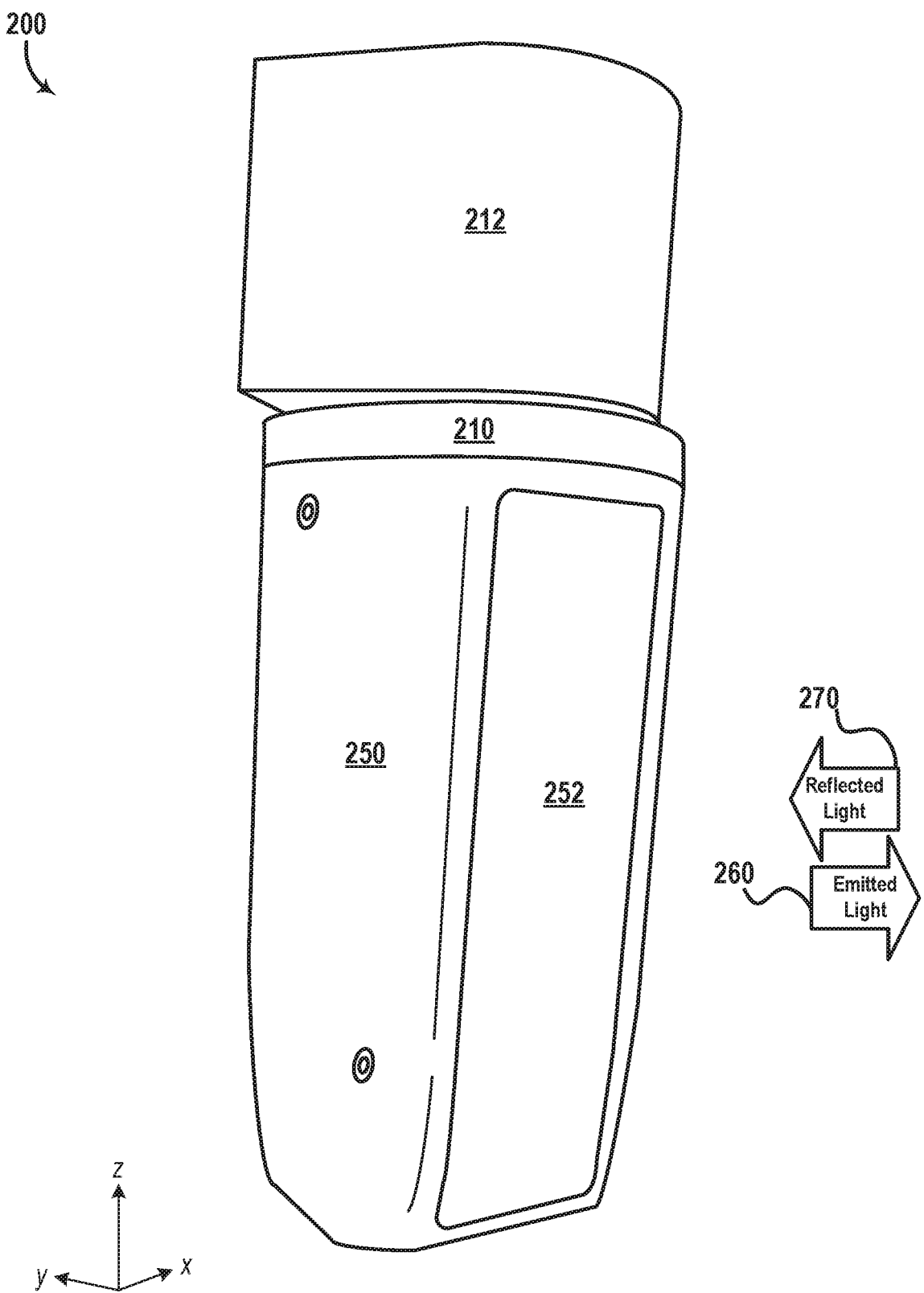
FIG. 2A is an illustration of a LIDAR device, according to example embodiments.

FIG. 2A illustrates a LIDAR device 200, according to example embodiments. As shown, LIDAR device 200 includes a rotating platform 210, a stationary platform 212, and a housing 250 that are similar, respectively, to rotating platform 110, stationary platform 112, and housing 150 of system 100.

LIDAR device 200 may be configured to scan an environment by emitting light 260 toward the environment, and detecting reflected portions (e.g., reflected light 270) of the emitted light returning to LIDAR device 200 from the environment. Further, to adjust a FOV scanned by LIDAR device 200 (i.e., the region illuminated by emitted light 260), rotating platform 210 may be configured to rotate housing 250 (and one or more components included therein) about an axis of rotation of rotating platform 210. For instance, where the axis of rotation of platform 210 is a vertical axis, rotating platform 210 may adjust the direction of emitted light 260 horizontally to define the horizontal extents of the FOV of LIDAR device 200.

As shown, LIDAR device 200 also includes an optical window 252 through which emitted light 260 is transmitted out of housing 250, and through which reflected light 270 enters into housing 250. Although not shown, housing 250 may also include another optical window located at an opposite side of housing 250 from optical window 252. Thus, housing 250 may define an optical cavity in which one or more components disposed inside the housing (e.g., transmitter, receiver, etc.) are optically isolated from external light in the environment, except for light that propagates through one or more optical windows. With this arrangement for instance, LIDAR device 200 may reduce interference from external light (e.g., noise, etc.) with transmitted signals 260 and/or reflected signals 270.

To that end, in some embodiments, optical window 252 may include a material that is transparent to the wavelengths of emitted light 270 and/or one or more other wavelengths. For example, optical window 252 may be formed from a glass substrate or a plastic substrate, among others. Additionally, in some examples, optical window 252 may include or may be coupled to a filter that selectively transmits wavelengths of emitted light 260, while reducing transmission of other wavelengths through the optical window 252. Optical window 252 may have various thicknesses. In one embodiment, optical window 252 may have a thickness between 1 millimeter and 2 millimeters. Other thicknesses are possible.

Figure 2B:
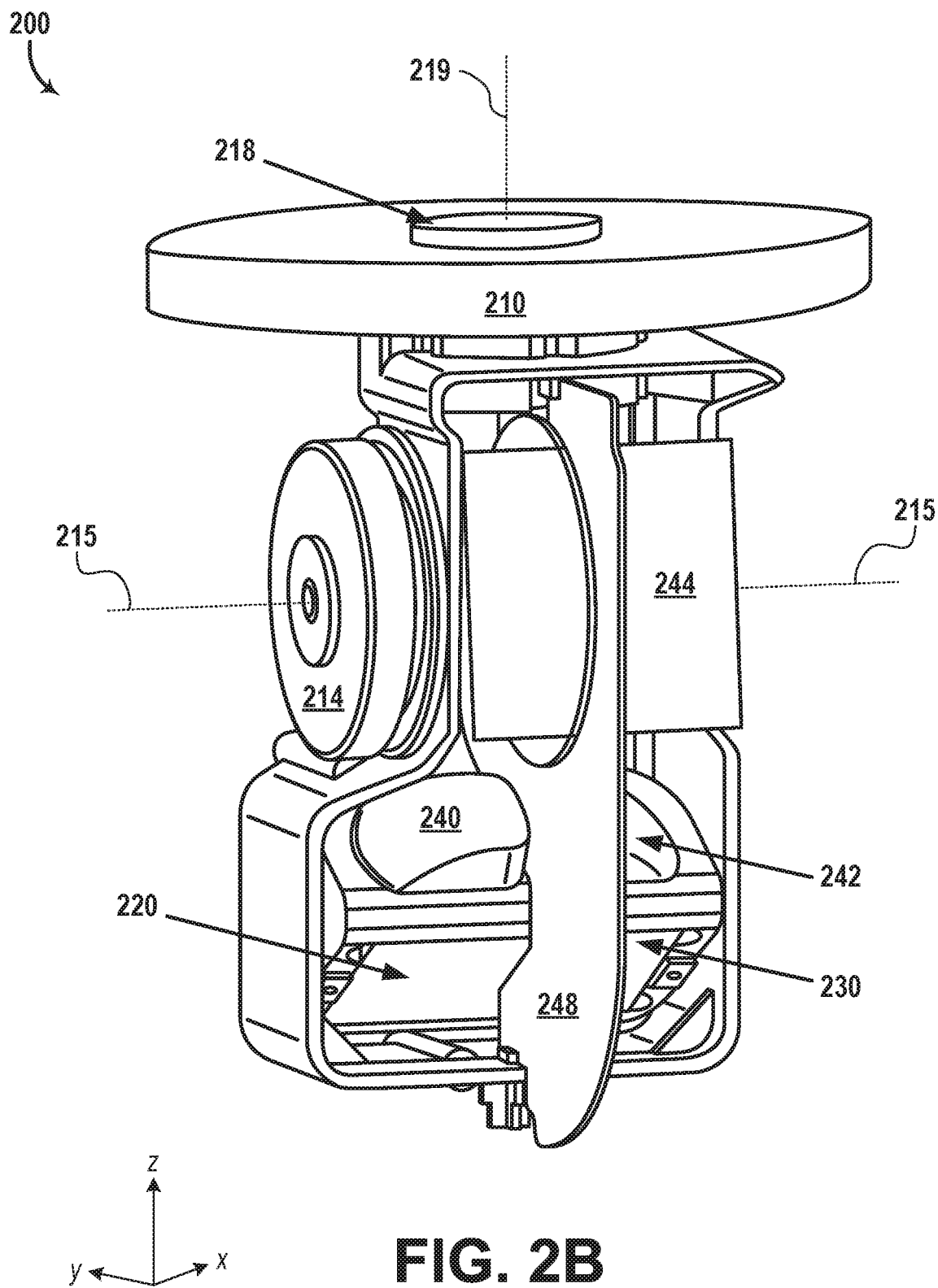
FIG. 2B is an illustration of a partial cross-section of a LIDAR device, according to example embodiments.

FIG. 2B illustrates a partial cross-sectional view of LIDAR device 200. It is noted that some of the components of LIDAR device 200 (e.g., platform 212, housing 250, and optical window 252) are omitted from the illustration of FIG. 2B for convenience in description.

As shown in FIG. 2B, LIDAR device 200 also includes actuators 214 and 218, which may be similar to actuators 114 of system 100. Additionally, as shown, LIDAR device 200 includes a transmitter 220 and a receiver 230, which may be similar, respectively, to transmitter 120 and receiver 130 of system 100. Additionally, as shown, LIDAR device 200 includes one or more optical elements (i.e., a transmit lens 240, a receive lens 242, and a mirror 244), which may be similar to optical elements 140 of system 100.

Actuators 214 and 218 may include a stepper motor, an electric motor, a combustion motor, a pancake motor, a piezoelectric actuator, or any other type of actuator, such as those described for actuators 114 of system 100.

As shown, actuator 214 may be configured to rotate the mirror 244 about a first axis 215, and actuator 218 may be configured to rotate rotating platform 210 about a second axis 219. In some embodiments, axis 215 may correspond to a horizontal axis of LIDAR device 200 and axis 219 may correspond to a vertical axis of LIDAR device 200 (e.g., axes 215 and 219 may be aligned substantially perpendicular to one another).

In an example operation, LIDAR transmitter 220 may emit light (via transmit lens 240) that reflects off mirror 244 to propagate away from LIDAR device 200 (e.g., as emitted light 260 shown in FIG. 2A). Further, received light from the environment of LIDAR device 200 (including light 270 shown in FIG. 2A) may be reflected off mirror 244 toward LIDAR receiver 230 (via lens 242). Thus, for instance, a vertical scanning direction of LIDAR device 200 can be controlled by rotating mirror 244 (e.g., about a horizontal axis 215), and a horizontal scanning direction of LIDAR device 200 can be controlled by rotating device LIDAR device 200 about a vertical axis (e.g., axis 219) using rotating platform 210. In some embodiments, transmitted light from the LIDAR transmitter 220 and reflected light from the environment may interact with different portions of the mirror 244 (e.g., a transmit portion and a receive portion). Such portions may be separated by a physical baffle 248. The baffle 248 may be absorptive of wavelengths of light emitted by the LIDAR transmitter 220, in some embodiments, such that receive light is not inadvertently transmitted to a transmit portion of the mirror 244 and transmit light is not inadvertently transmitted to a receive portion of the mirror 244. In some embodiments, the transmit portion of the mirror 244 may be smaller than the receive portion of the mirror 244 (e.g., in surface area). Alternatively, the transmit portion of the mirror 244 may be larger than the receive portion of the mirror 244 or the same size as the receive portion of the mirror 244.

In this example, mirror 244 could be rotated while transmitter 220 is emitting a series of light pulses toward the mirror. Thus, depending on the rotational position of the mirror 244 about axis 215, each light pulse could thus be steered (e.g., vertically). As such, LIDAR device 200 may scan a vertical FOV defined by a range of (vertical) steering directions provided by mirror 244 (e.g., based on a range of angular positions of mirror 244 about axis 215). In some examples, LIDAR device 200 may be configured to rotate mirror 244 one or more complete rotations to steer emitted light from transmitter 220 (vertically). In other examples, LIDAR device 200 may be configured to rotate mirror 244 within a given range of angles to steer the emitted light over a particular range of directions (vertically). Thus, LIDAR device 200 may scan a variety of vertical FOVs by adjusting the rotation of mirror 244. In one embodiment, the vertical FOV of LIDAR device 200 is 110°.

Continuing with this example, platform 210 may be configured to rotate the arrangement of components supported thereon (e.g., mirror 244, actuator 214, lenses 240 and 242, transmitter 220, and receiver 230) about a vertical axis (e.g., axis 219). Thus, LIDAR device 200 may rotate platform 210 to steer emitted light (from transmitter 220) horizontally (e.g., about the axis of rotation 219 of platform 210). Additionally, the range of the rotational positions of platform 210 (about axis 219) can be controlled to define a horizontal FOV of LIDAR device 200. In one embodiment, platform 210 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 2C:
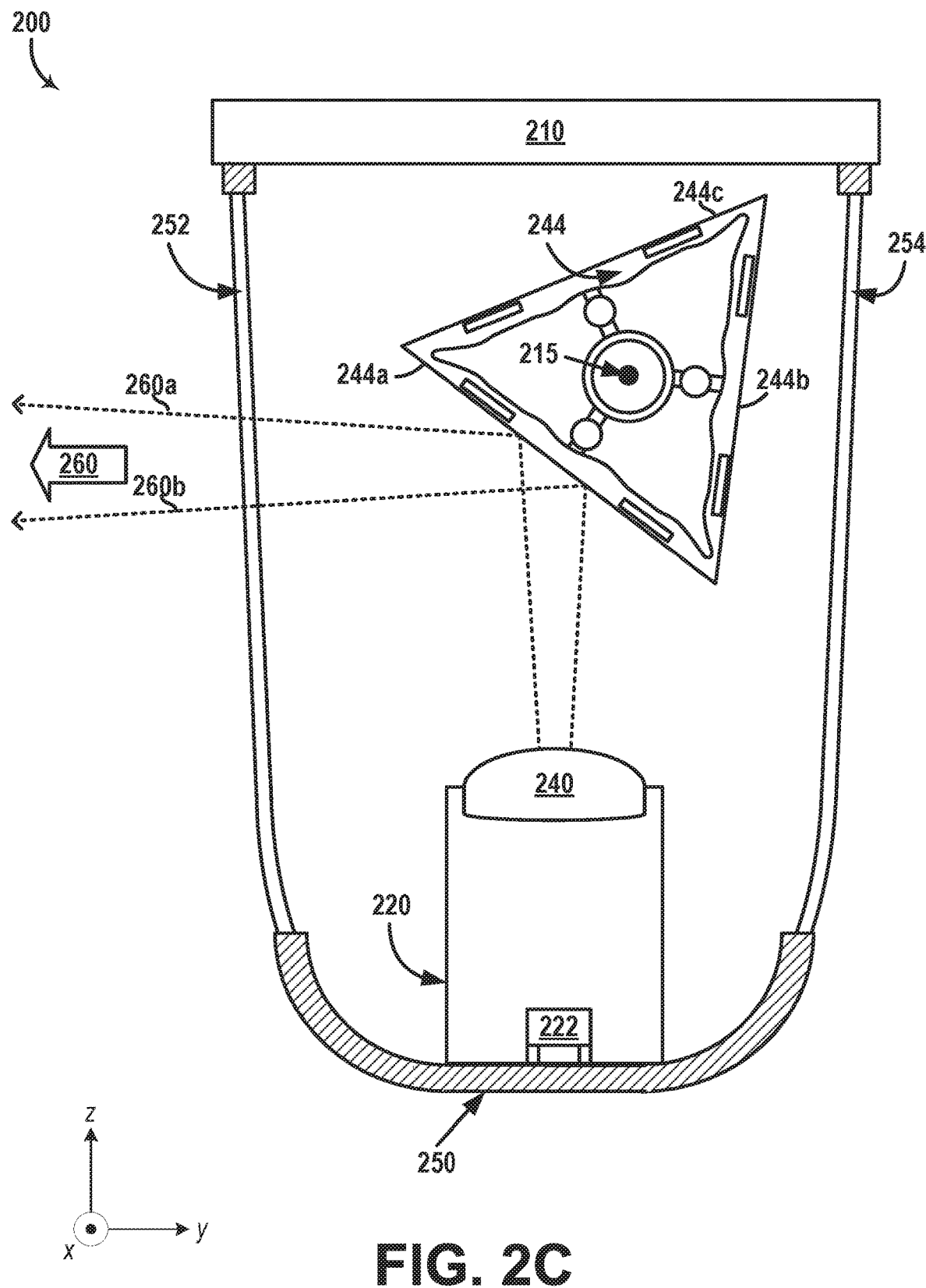
FIG. 2C is an illustration of a partial cross-section of a LIDAR device, according to example embodiments.

FIG. 2C illustrates a partial cross-sectional view of LIDAR device 200. It is noted that some of the components of LIDAR device 200 are omitted from the illustration of FIG. 2C for convenience in description. In the cross-sectional view of FIG. 2C, axis 215 may be perpendicular to (and may extend through) the page (e.g., parallel to the x-axis, as illustrated).

As shown in FIG. 2C, LIDAR device 200 also includes a second optical window 254 that is positioned opposite to optical window 252. Optical window 254 may be similar to optical window 252. For example, optical window 254 may be configured to transmit light into and/or out of the optical cavity defined by housing 250.

As shown in FIG. 2C, transmitter 220 includes an emitter 222, which may include any of the light sources described for emitter(s) 122, for instance. In alternative embodiments, transmitter 220 may include more than one light source. Emitter 222 may be configured to emit one or more light pulses 260 (e.g., laser beams, etc.). Transmit lens 240 may be configured to direct (and/or collimate) the emitted light from emitter 222 toward mirror 244. For example, transmit lens 240 may collimate the light from the emitter to define a beam width of the light beam 260 transmitted out of LIDAR device 200 (e.g., the beam divergence angle between dotted lines 260a and 260b).

As shown in FIG. 2C, mirror 244 may include three reflective surfaces 244a, 244b, 244c (e.g., triangular mirror). In alternative examples, mirror 244 may instead include additional or fewer reflective surfaces. In the example shown, the emitted light transmitted through transmit lens 240 may then reflect off reflective surface 244a toward the environment of LIDAR device 200 in the direction illustrated by arrow 260. Thus, in this example, as mirror 244 is rotated (e.g., about axis 215), emitted light 260 may be steered to have a different direction (e.g., pitch direction, etc.) than that illustrated by arrow 260. For example, the direction 260 of the emitted light could be adjusted based on the rotational position of triangular mirror 244.

Additionally, in some examples, emitted light 260 may be steered out of housing 250 through optical window 252 or through optical window 254 depending on the rotational position of mirror 244 about axis 215. Thus, in some examples, LIDAR device 200 may be configured to steer emitted light beam 260 within a wide range of directions (e.g., vertically), and/or out of either side of housing 250 (e.g., the sides where optical windows 252 and 252 are located).

Figure 2D:
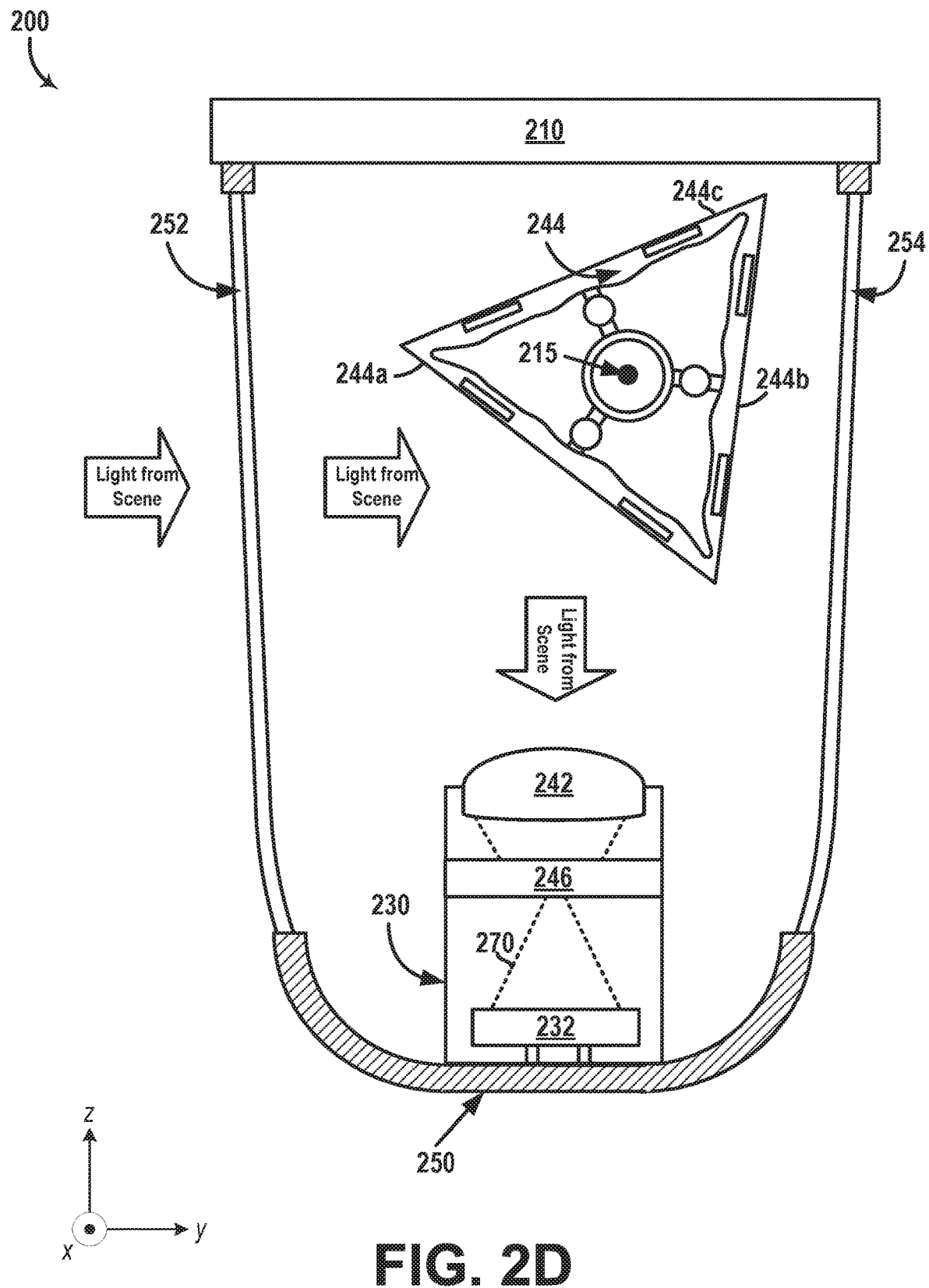
FIG. 2D is an illustration of a partial cross-section of a LIDAR device, according to example embodiments.

FIG. 2D illustrates another partial cross-sectional view of LIDAR device 200. It is noted that some of the components of LIDAR device 200 are omitted from the illustration of FIG. 2D for convenience in description. As shown, receiver 230 includes one or more light detectors 232, which may be similar to detector(s) 132 of system 100. Further, as shown, receiver 230 includes a diaphragm 246 between receive lens 242 and detector(s) 232.

Diaphragm 246 may include one or more optical elements (e.g., aperture stop, filter, etc.) configured to select a portion of the light focused by receive lens 242 for transmission toward detector(s) 232.

For example, receive lens 242 may be configured to focus light received from the scene scanned by LIDAR device 200 (e.g., light from the scene that enters window 252 or window 254 and is reflected by mirror 244) toward diaphragm 246. In line with the discussion above, detector(s) 232 may be arranged (or aligned) to intercept a portion of the focused light that includes light from the target region illuminated by transmitter 220. To facilitate this, for example, diaphragm 246 may include an aperture positioned and/or sized to transmit the portion of the focused light associated with the target region through the aperture as diverging light (e.g., including reflected light 270) for detection by detector(s) 232.

It is noted that the various positions, shapes, and sizes of the various components of LIDAR device 200 as well as the light beams emitted (or received) by LIDAR device 200 may vary and are not necessarily to scale, but are illustrated as shown in FIGS. 2A-2D for convenience in description. Additionally, it is noted that LIDAR device 200 may alternatively include additional, fewer, or different components than those shown in FIGS. 2A-2D.

Some example implementations herein involve a vehicle that includes a sensor, such as system 100, device 200, and/or other types of sensors (e.g., RADARs, SONARs, cameras, other active sensors, etc.). However, an example sensor disclosed herein can also be used for various other purposes and may be incorporated in or otherwise connected to any feasible system or arrangement. For instance, an example LIDAR device herein can be used in an assembly line setting to monitor objects (e.g., products) being manufactured in the assembly line. Other examples are possible as well.

Some example LIDAR devices herein may be used with any type of vehicle, including conventional automobiles as well as automobiles having an autonomous or semi-autonomous mode of operation (i.e., autonomous or semi-autonomous vehicles). Further, the term "vehicle" is to be broadly construed to cover any moving object, including, for instance, a truck, a van, a semi-trailer truck, a motorcycle, a golf cart, an off-road vehicle, a warehouse transport vehicle, a farm vehicle, an airplane, a helicopter, a boat, or a submarine, as well as a carrier that rides on a track such as a rollercoaster, trolley, tram, or train car, etc.

Figure 3:
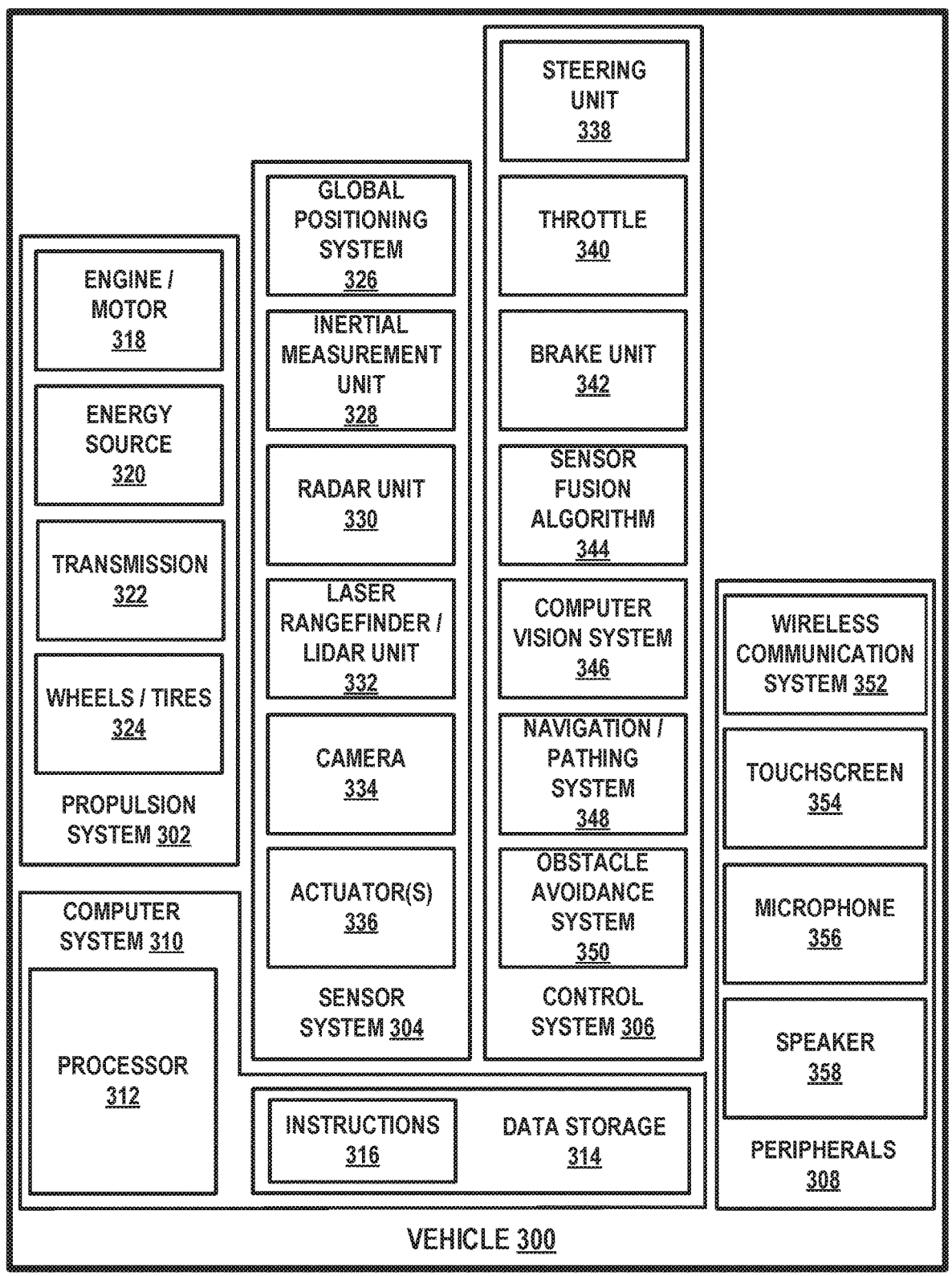
FIG. 3 is a simplified block diagram of a vehicle, according to example embodiments.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an 02 monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser rangefinder or LIDAR unit 332 may be any sensor configured to sense objects in the environment in which vehicle 300 is located using lasers. For example, LIDAR unit 332 may include one or more LIDAR devices, which may be similar to system 100 and/or device 200 among other possible LIDAR configurations.

Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio-frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may include one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

FIG. 4A is an illustration of a partial cross-section of a LIDAR device 400, according to example embodiments. As illustrated, the LIDAR device 400 may include a light emitter 402, an FAC lens 404, a transmit lens 406, a window 408, and an epoxy layer 412. The epoxy layer 412 may be used to adhere the FAC lens 404 to the light emitter 402 and may occupy the separation between the FAC lens 404 and the light emitter 402. As illustrated, the separation (e.g., along a z-direction) between the light emitter 402 and the FAC lens 404 may be adjusted so as to achieve a minimized divergence of the light signal emitted by the light emitter 402 along a fast axis of the light emitter 402 (e.g., the separation may be about equal to the back focal length of the FAC lens 404 in air ($f_1$)). In some embodiments, the back focal length of the FAC lens 404 in air (i.e., $f_1$) may be between 250 μm and 750 μm, for example. In other embodiments, the back focal length of the FAC lens 404 in air (i.e., $f_1$) may be between 1 mm and 10 mm. Still other back focal lengths are also possible. As also illustrated, the separation (e.g., along a z-direction) between the FAC lens 404 and the transmit lens 406 may be about equal to a focal length of the transmit lens 406 in air ($f_2$).

The light emitter 402 may include one or more of a variety of light sources (e.g., light sources similar to those described above with respect to the emitter(s) 122 of FIG. 1). For example, the light emitter 402 may be an array of laser diodes. The laser diodes may each emit light that propagates along the z-direction, as illustrated. The light emitted by the laser diodes may diverge. For example, the light emitted by the laser diodes may diverge quickly (e.g., at an angle between 30° and 45°) along a fast axis (e.g., along the y-axis, as illustrated) and slowly (e.g., at an angle between 5° and 10°) along a slow axis (e.g., along the x-axis, as illustrated). The dashed lines illustrated in FIG. 4A are used to show the divergence of a light beam emitted by one of the laser diodes of the light emitter 402 (i.e., the array of laser diodes). It is understood that each of the laser diodes of the light emitter 402 may emit a separate light beam (e.g., that, collectively, define a light signal emitted by the light emitter 402).

The epoxy layer 412 may be transparent to light emitted by the light emitter 402. For example, the epoxy layer 412 may not absorb or reflect light of the wavelength(s) emitted by the light emitter 402. Similarly, the window 408 may be made of a material that is transparent to the light transmitted by the transmit lens 406.

Assembling the LIDAR device 400 may include applying an uncured epoxy layer 412 between an emission surface of the light emitter 402 and a receiving surface of the FAC lens 404. Then, before the epoxy layer 412 sets, the FAC lens 404 may be positioned such that it is separated from the light emitter 402 by a distance that corresponds to a minimized divergence for light signals emitted by the light emitter 402 and transmitted through the FAC lens 404. After positioning the FAC lens 404, the epoxy layer 412 may be allowed to cure. In some embodiments, additional epoxy material that is not disposed between the emission surface of the light emitter 402 and the receiving surface of the FAC lens 404 may be removed from the epoxy layer 412 (i.e., extraneous epoxy may be removed from the epoxy layer 412, e.g., by planarizing the epoxy layer 412).

The FAC lens 404 may be an astigmatic lens (e.g., a cylindrical lens or a plano-acylindrical lens) configured to collimate light signals along a fast axis of divergence. In some embodiments, the light emitter 402 may have an asymmetrical divergence (e.g., a fast axis and a slow axis). As such, the FAC lens 404 may be used to limit the divergence along the faster of the two axes. As stated above, the FAC lens 404 and the light emitter 402 may be separated by a distance such that the light signal leaving the FAC lens 404 is collimated along the fast axis (e.g., y-axis, as illustrated). Hence, as illustrated in FIG. 4A, the light signal may be collimated along the fast axis when leaving the FAC lens 404 and when entering the transmit lens 406.

In some embodiments (e.g., embodiments where the light signal entering the transmit lens 406 is not collimated), the transmit lens 406 may reduce the divergence of the light (e.g., along a fast axis and/or a slow axis). For example, the transmit lens 406 may collimate the light signal (e.g., along a fast axis and/or a slow axis) prior to the light signal being transmitted to the surrounding environment via the window 408. Collimation of the light signal may maintain a given signal intensity of the light signal as it is directed to targets in the surrounding environment. Further, in some embodiments, the transmit lens 406 may include a spherical lens or an astigmatic lens.

Figure 4B:
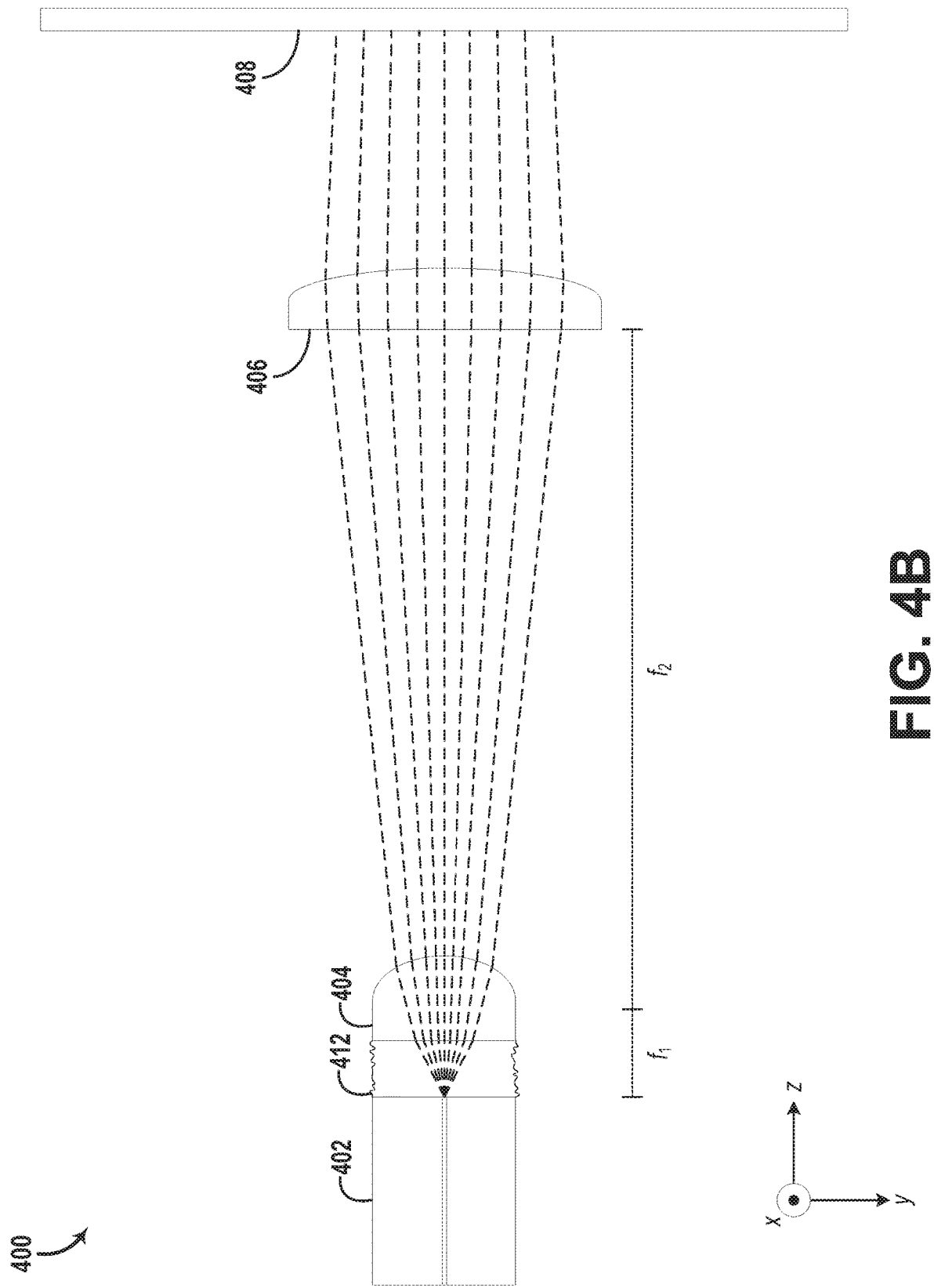
FIG. 4B is an illustration of a partial cross-section of a LIDAR device, according to example embodiments.

To modify the divergence of the light signal exiting the transmit lens 406 and the window 408, the position of the FAC lens 404 relative to the light emitter 402 may be adjusted. For example, as illustrated in FIG. 4B, the FAC lens 404 may be positioned relative to the light emitter 402 such that the separation between the light emitter 402 and the FAC lens 404 is less than the separation that would correspond to an optimized collimation along the fast axis for transmitted light signals. For example, the separation between the FAC lens 404 and the light emitter 402 may be between 80.0% and 99.9% of a separation that would correspond to an optimized collimation along the fast-axis for the reduced-divergence light (e.g., the light output from the FAC lens 404). Other separations between the FAC lens 404 and the light emitter 402 are also possible. For example, in alternate embodiments, the separation between the light emitter 402 and the FAC lens 404 may be greater than the separation that would correspond to an optimized collimation along the fast axis for transmitted light signals. Such an arrangement would result in a larger beam-size of the reduced-divergence signal when the reduced-divergence signal reaches the transmit lens 406.

An arrangement where the FAC lens 404 and the light emitter 402 are separated by a distance less than the back focal length of the FAC lens 404 in air (i.e., $f_1$) may result in a light signal that is not collimated along the fast axis when exiting the FAC lens 404 (as illustrated) and is expanded at the transmit lens 406 (e.g., where the light signal has a beam width approximately equal to the size of the transmit lens 406 measured along the fast-axis direction). For example, the light signal emitted by the light emitter 402 may diverge along the fast axis when exiting the FAC lens 404. As such, the light entering the transmit lens 406 may be diverging along the fast axis and, as a result of the divergence, have a larger beam diameter along the fast axis than in the embodiment illustrated in FIG. 4A. Thereafter, the light signal may have its divergence reduced by the transmit lens 406 (e.g., the light signal may be collimated by the transmit lens 406). However, given that the beam diameter along the fast axis was larger at the transmit lens 406 in the embodiment of FIG. 4B than the embodiment of FIG. 4A, the beam diameter along the fast axis will also be larger at the window 408 in the embodiment of FIG. 4B. As a result, debris or defects at the window 408 may have less of an adverse effect on the light signal transmitted to the surrounding environment in the embodiment of FIG. 4B than in the embodiment of FIG. 4A. For example, because the beam is expanded when exiting the window 408, mud, condensation, or other debris on the window 408 and/or cracks or defects in the window 408 may be at least partially avoided. Additionally, by having an expanded beam exiting the window 408, the intensity of the beam (e.g., as measured in W/m$^2$) transmitted to the surrounding environment is also reduced. Reducing the intensity of the transmitted beam may further enhance the eye safety of the LIDAR device 400 (i.e., reduce the risk posed to human eyes by the emitted light signal beyond existing standards).

Although such an expansion of the transmitted signal at the window 408 is achieved in the embodiment of FIG. 4B by adjusting the positioning of the FAC lens 404 relative to the light emitter 402, it is understood that a similar result could be achieved by modifying the shape of the FAC lens 404 (e.g., in addition to or instead of modifying the location of the FAC lens 404). For example, the curvature of the face on the transmission side of the FAC lens 404 may be modified to change the back focal length of the FAC lens 404.

In some embodiments, the LIDAR device 400 may include additional or alternative components not illustrated in FIG. 4A or 4B. For example, the LIDAR device 400 may include an aperture to more specifically select the light emitted by the light emitter 402 that gets transmitted to the surrounding environment. Additionally, though not illustrated in FIG. 4A or 4B, it is understood that the LIDAR device 400 may include one or more light sensors (e.g., similar to the receiver 230 illustrated in FIG. 2D) configured to detect the light emitted from the light emitter 402 once that light has been reflected from one or more objects in a surrounding environment and/or one or more receive lenses and/or mirrors configured to direct the light reflected from one or more objects in the surrounding environment to the light sensor.

Figure 4C:
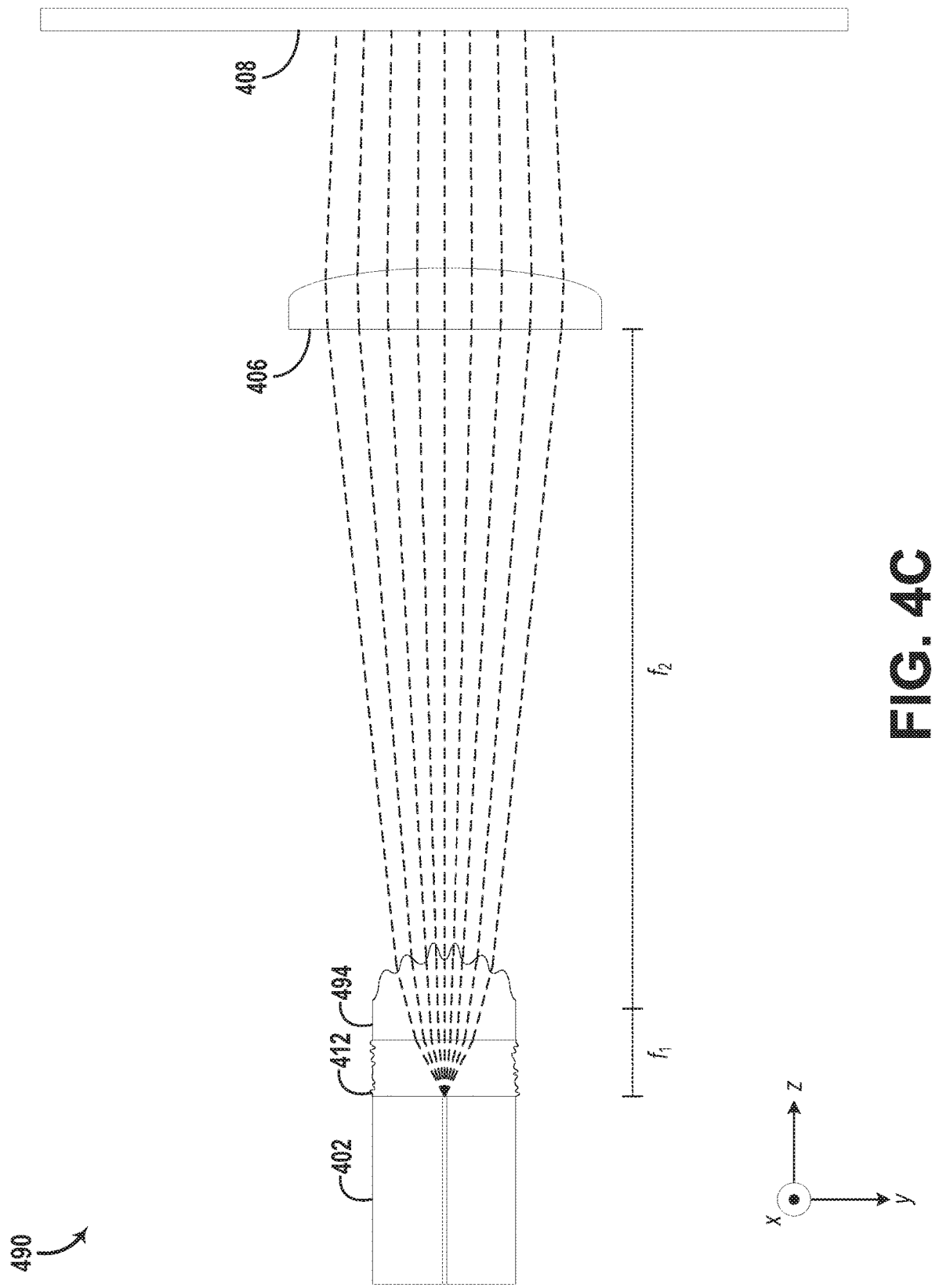
FIG. 4C is an illustration of a partial cross-section of a LIDAR device, according to example embodiments.

The LIDAR device 400 may additionally include one or more diffusive elements. For example, the LIDAR device 400 may include an engineered diffuser (e.g., holographic diffuser or a micro-lens array) positioned on or near the transmission surface of the FAC lens 404 along the optical path of the transmitted signal. In some embodiments, for example, the engineered diffuser may be integrated with a surface of the FAC lens 404. Such engineered diffusers could increase the beam diameter and/or divergence (e.g., along a fast axis and/or a slow axis). Further, an engineered diffuser may generate a non-gaussian beam-intensity profile for the light transmitted to the transmit lens from the FAC lens 404 (i.e., the reduced-divergence light). In some embodiments, the engineered diffuser may include physical surface features such as a grating and/or ripples. For example, the physical surface features could include protrusions with heights and/or periodicities between 5 µm and 25 µm. FIG. 4C illustrates an example LIDAR device 490 having such an FAC lens 494 that includes an engineered diffuser. It is understood that the FAC lens 494 illustrated in FIG. 4C is provided as an example, and that other shapes, sizes, or numbers of ripples or protrusions on a transmit surface of the FAC lens 494 are also possible and are contemplated herein. In some embodiments, the surface of the FAC lens 494 may includes a series of sub-surfaces. Each of the sub-surfaces may have a width (e.g., length measured along the y-direction, as illustrated) and/or a surface profile chosen such that an intensity and a phase of a light ray from the light emitter 402 is approximately uniform over the sub-surface. Additionally or alternatively, each of the sub-surfaces may have a width and/or a surface profile chosen such that a far-field diffraction pattern corresponding to the overall surface, when illuminated by a light signal from the light emitter 402 having an approximately uniform wavefront, has a desired beam profile. In various embodiments, the surface profiles of the sub-surfaces may be continuous or pixelated (e.g., as dictated by size and/or fabrication method).

Additionally or alternatively, the LIDAR device 400 may include additional lenses. For example, in embodiments where the FAC lens 404 is separated from the light emitter 402 by a distance less than the distance at which fast-axis collimation of the light transmitted by the light emitter passing through the FAC lens 404 will be optimized, an astigmatic lens (e.g., a cylindrical lens or a plano-acylindrical lens) may be positioned along the optical axis after the transmit lens 406. In this way, the light signal exiting the transmit lens 406 may be collimated (e.g., along a fast axis) prior to being transmitted to the surrounding environment via the window 408. The shape of such an astigmatic lens (e.g., the curvature of a transmit face of the astigmatic lens) may be set based on the separation between the FAC lens 404 and the light emitter 402, the separation between the FAC lens 404 and the transmit lens 406, and/or the separation between the transmit lens 406 and the astigmatic lens.

Figure 5A:
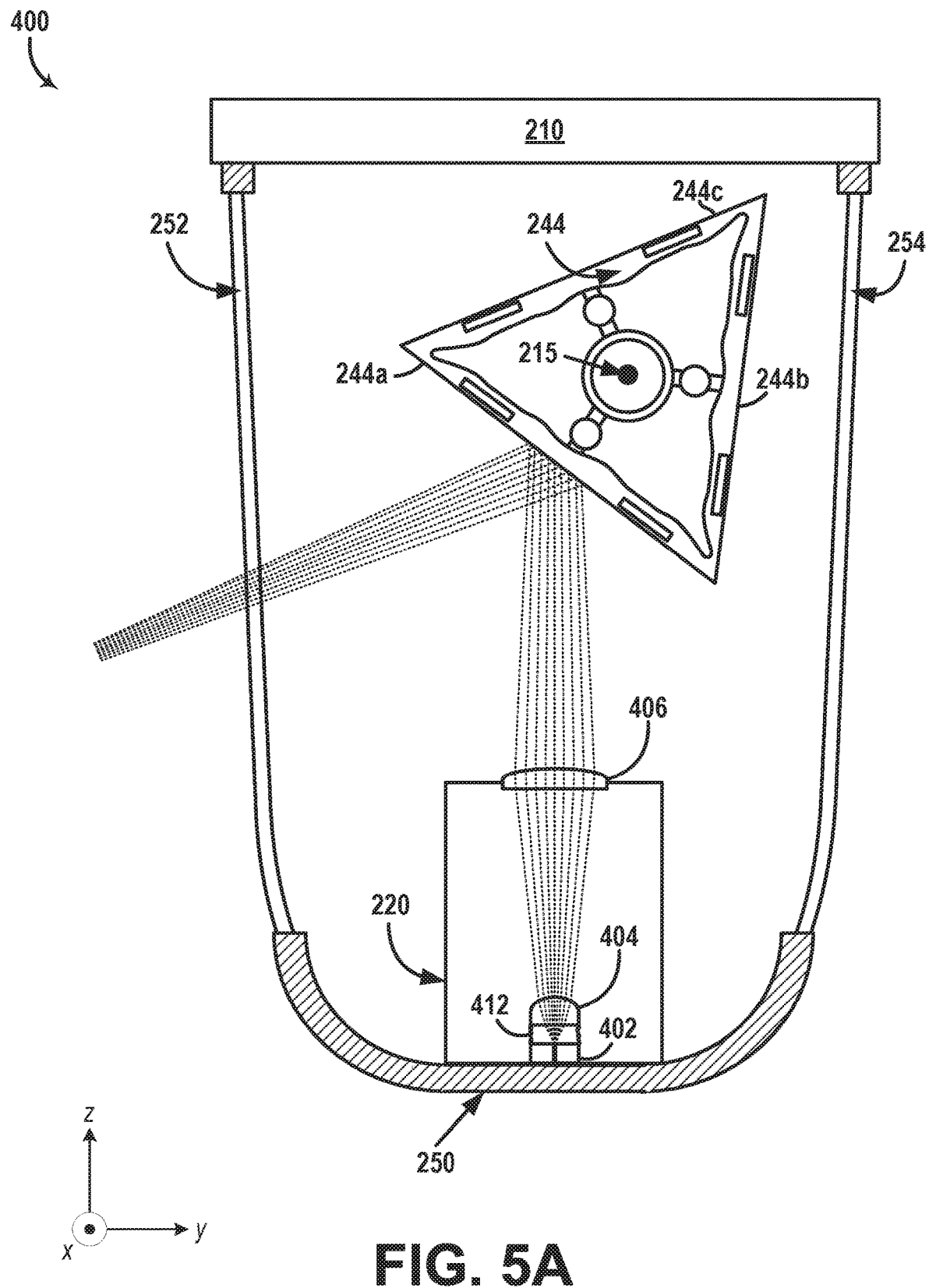
FIG. 5A is an illustration of a partial cross-section of a LIDAR device, according to example embodiments.

In addition, the LIDAR device 400 may include one or more mirrors (e.g., rotating multi-faceted mirrors) configured to redirect the light (e.g., which may allow the device to direct the light to a specific location in a surrounding environment). For example, the one or more mirrors may be similar to mirror 244 illustrated in FIGS. 2B-2D, which has reflective facets configured to direct light to the surrounding environment. In such embodiments, the light emitter 402, FAC lens 404, transmit lens 406, and the epoxy layer 412 may be oriented vertically within an optical cavity. Such an embodiment is illustrated in FIG. 5A. As illustrated, the light signal may be emitted vertically (e.g., parallel to the z-axis, as illustrated in FIG. 5A) within an optical cavity, modified by the FAC lens 404, modified by the transmit lens 406, reflected off of the mirror 244 (e.g., off of a facet of the mirror 244, such as the reflective surface 244a), and, finally, transmitted to a surrounding environment via the window 252 (the window 252 illustrated in FIG. 5A may correspond to the window 408 illustrated in FIGS. 4A and 4B, for example). In some embodiments, upon moving the FAC lens 404 nearer to the light emitter 402 and in order to accommodate a larger light signal exiting the transmit lens 406, the size of the mirror 244 may be adjusted (e.g., expanded) and/or the orientation of the mirror 244 or the orientation of the combination of the light emitter 402, the FAC lens 404, and the transmit lens 406 may be adjusted. For example, if a baffle (e.g., the baffle 248 illustrated in FIG. 2B) is used to separate a transmit side of the mirror 244 from a receive side of the mirror 244, the baffle may be translated and/or rotated to accommodate the larger beam diameter at the face of the mirror 244.

Figure 5B:
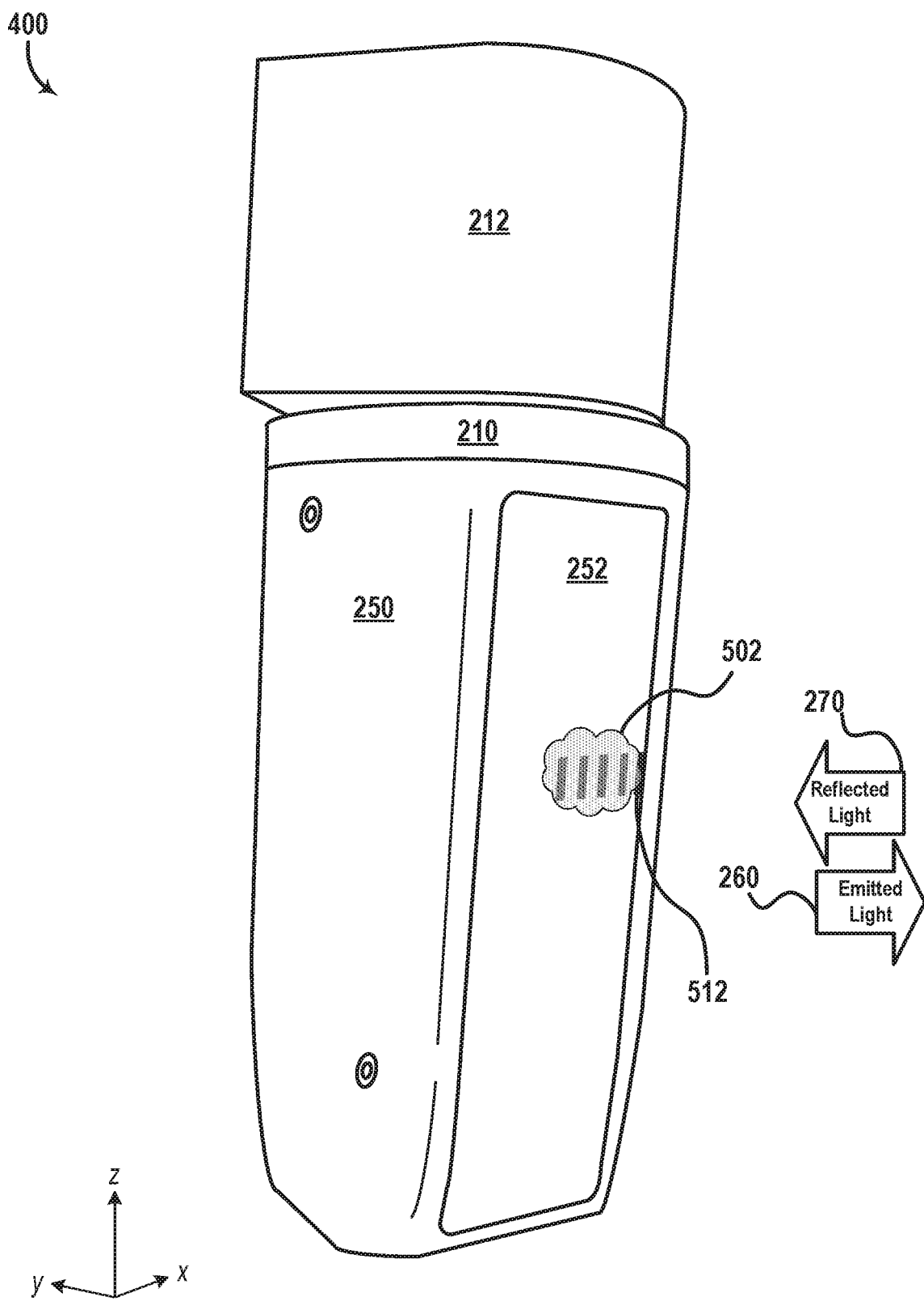
FIG. 5B is an illustration of a LIDAR device, according to example embodiments.
Figure 5C:
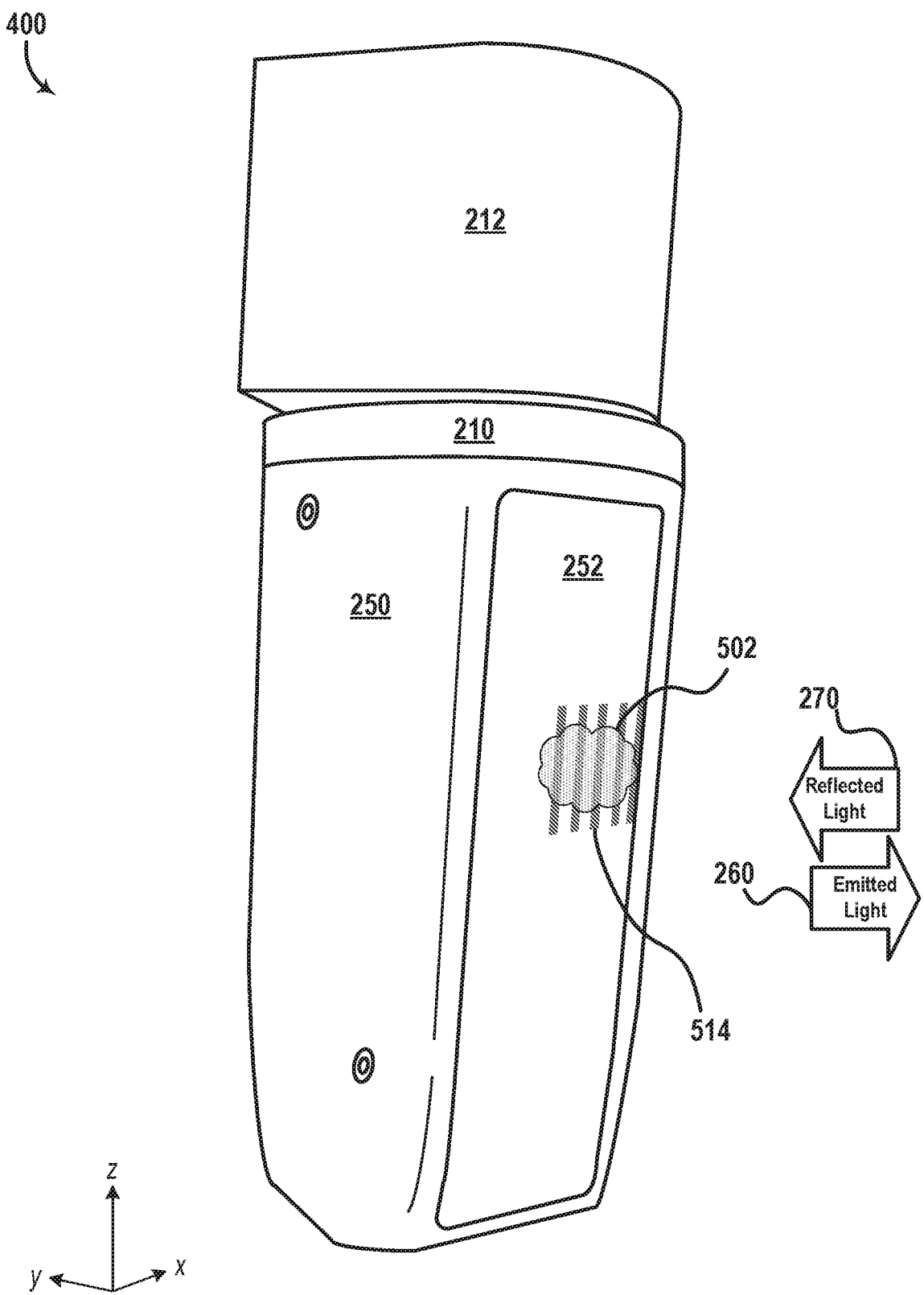
FIG. 5C is an illustration of a LIDAR device, according to example embodiments.

FIGS. 5B and 5C provide illustrations of the size of the beam from the light emitter 402 relative to the size of the window 252 when employing the embodiments of the LIDAR device 400 in FIGS. 4A and 4B, respectively. FIGS. 5B and 5C also illustrate an occlusion 502 on the window 252. The occlusion 502 may be debris (e.g., mud or dirt). Alternatively, the occlusion 502 may be a defect in the window 252 (e.g., a crack or an impurity). In some cases, the occlusion 502 may be completely opaque. Alternatively, portions or the entirety of the occlusion 502 may be partially transparent (e.g., the occlusion 502 may include raindrops that redirect, but do not entirely block, transmitted light signals from reaching the surrounding environment, which could lead to undesired measurement noise, such as blooming effects).

Based on the position of the FAC lens 404 relative to the light emitter 402 in FIG. 4A, the transmitted signal 512 of FIG. 5B may be substantially interfered with by the occlusion 502 (e.g. at least 50%, at least 75%, at least 90%, or at least 99% of the transmitted signal 512 may be occluded by the occlusion 502). In some embodiments, the surface area of the window 252 occupied by the transmitted signal 512 (e.g., as marked by the periphery of the transmitted signal 512 on the window 252), alternatively referred to as the "beam size," may be between 1 mm$^2$ and 5 mm$^2$.

Somewhat differently, though, based on the position of the FAC lens 404 relative to the light emitter 402 in FIG. 4B, the transmitted signal 514 of FIG. 5C may be less substantially interfered with by the occlusion 502 than the transmitted signal 512 of FIG. 5B. For example, at most 50%, at most 25%, at most 10%, or at most 1% of the transmitted signal 514 may be occluded by the occlusion 502. In some embodiments, the surface area of the window 252 occupied by the transmitted signal 514 (e.g., as marked by the periphery of the transmitted signal 514 on the window 252), alternatively referred to as the "beam size," may be between 15 mm$^2$ and 30 mm$^2$. In other embodiments, the beam size may be at least 10 mm$^2$ at the window 252 or at least 100 mm$^2$ at the window 252. It is understood that the drawings are provided solely for illustrative purposes and that dimensions may be different than those illustrated (e.g., portions of the embodiments illustrated may not be illustrated to scale). For example, the transmitted signals 512, 514 in FIGS. 5B and 5C may be smaller or larger than illustrated in various embodiments.

In some embodiments, the transmitted signals 512, 514 may have a different pattern at the window 252 than illustrated in FIGS. 5B and 5C. For example, the light emitter 402 may include a device other than an array of laser diodes (e.g., an LED). In such embodiments, again, the transmitted signals 512, 514 may have a different pattern at the window 252 (e.g., a single dot or rectangle). Additionally or alternatively, the way one or more mirrors are oriented and/or the way the light emitter 402 is oriented within the LIDAR device 400 relative to the window 252 may alter the orientation or shape of the transmitted signals 512, 514 at the window 252.

In some embodiments, in addition to the FAC lens 404, the LIDAR device 400 may include one or more SAC lenses. In such embodiments, the size of the transmitted signals 512, 514 at the window 252 may also be adjusted. Such an embodiment is illustrated in FIG. 6. FIG. 6 is a partial cross-section of a LIDAR device having an SAC lens 604 in addition to the FAC lens. As illustrated, FIG. 6 is a cross-section taken along the y-axis. In other words, the partial cross-section illustrated in FIG. 6 is taken from a different perspective than the partial cross-sections of FIGS. 4A and 4B. The SAC lens 604 may collimate the light signal emitted by the light emitter 402 (e.g., each of the beams emitted by each laser diode of the array of laser diodes) along a slow axis of divergence.

As illustrated in FIG. 6, the SAC lens 604 may include a different lens region (i.e., lenslet) corresponding to each laser diode within the array of laser diodes of the light emitter 402 (e.g., five lenslets in total). In alternate embodiments, the LIDAR device may include multiple SAC lenses (e.g., one SAC lens corresponding to each of the laser diodes in the array of laser diodes), rather than a single SAC lens with multiple lens regions. A receive face of the SAC lens 604 may be separated from the transmit face of the FAC lens 404 by an air gap, as illustrated. The SAC lens 604 and the light emitter 402 may be separated by a distance such that divergence of light emitted by the light emitter along the slow axis is minimized when modified by the SAC lens 604. In alternate embodiments, the SAC lens 604 could be located at different places along the optical axis. For instance, the SAC lens 604 could instead be located between the light emitter 402 and the FAC lens 404 or after the transmit lens 406. In still other embodiments, the SAC lens and the FAC lens may instead be integrated into a single optic (rather than two discrete optics as illustrated in FIG. 6). Such an integrated optic may collimate the transmitted light along both the slow axis and the fast axis.

Still further, in some embodiments, the SAC lens 604 may be designed such that light rays emitted by each laser diode within the array of laser diodes of the light emitter 402 is directed in a slightly different angular direction (e.g., the array of emitted light rays are not parallel to one another and, instead, are shifted angularly relative to one another). In some cases, for example, the SAC lens 604 may orient the emitted light rays from each of the laser diodes such that each light ray passes through a center of the transmit lens 406 and/or an aperture associated with the transmit lens 406. Such an arrangement could be achieved by shifting the SAC lens 604 or respectively tilting one or more of the lens regions (i.e., lenslets) of the SAC lens 604. Embodiments where the SAC lens 604 modifies the angular spacing of the emitted light rays may allow for a decoupling between a pitch of the laser diodes within the array of laser diodes and the dependency of a focal length of the transmit lens 406 on a desired angular spacing of the transmitted light rays. Additionally or alternatively, varying the angular spacing of the emitted light rays may allow an overlap of one or more of the light rays at the transmit lens 406.

Any of the embodiments described herein could be applied to a LIDAR device with a single light emitter and a single detector (as described herein). However, it is understood that the techniques described herein could be applied to LIDAR devices with multiple emitters and multiple detectors. In such devices, additional mirrors, FAC lenses, or transmit lenses may be included for the respective emitters, for example.

III. Example Processes

Figure 7:
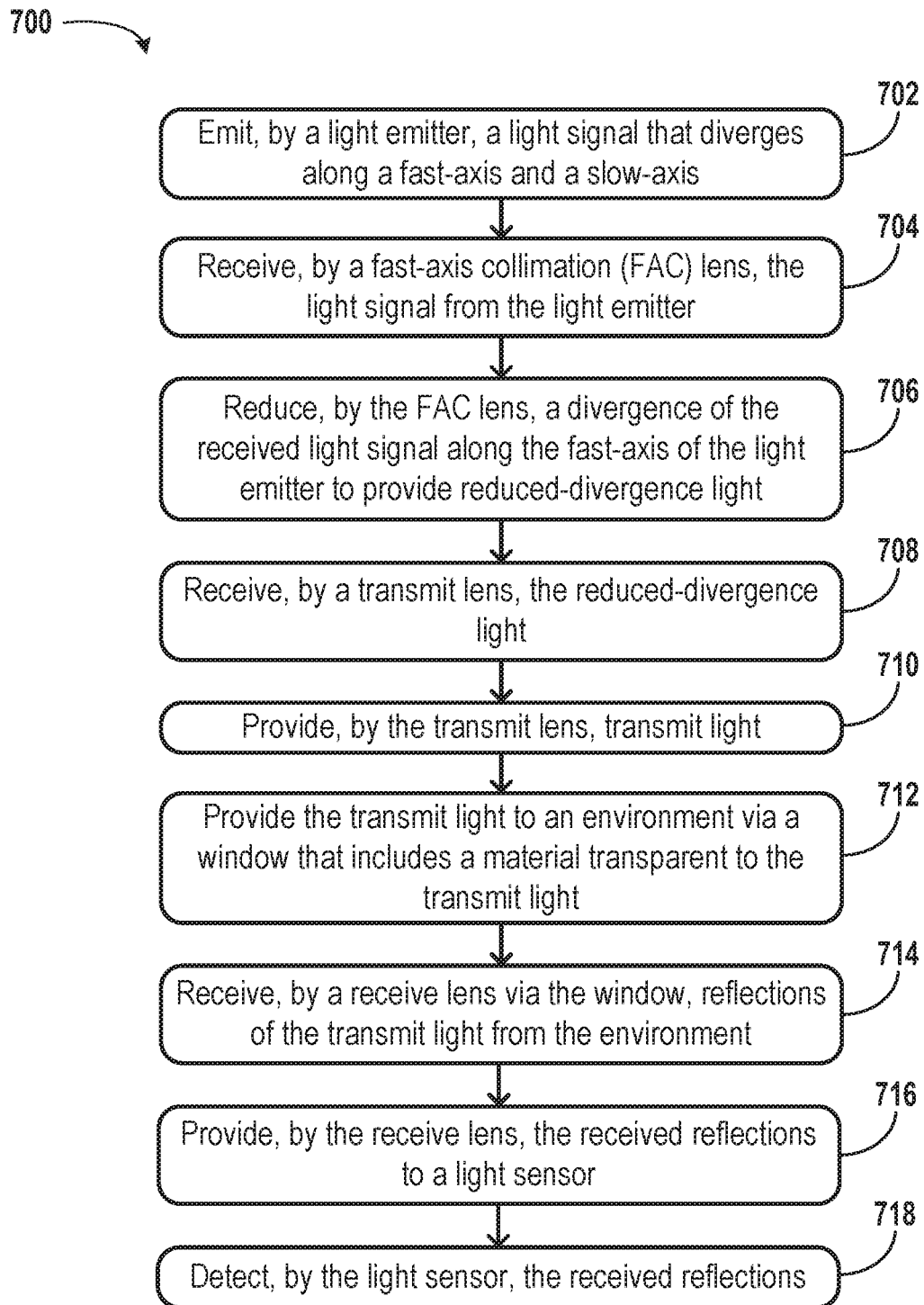
FIG. 7 is a flowchart illustration of a method, according to example embodiments.

FIG. 7 is a flowchart illustration of a method 700, according to example embodiments. In some embodiments, one or more of the blocks of FIG. 7 may be performed by a LIDAR device (e.g., the LIDAR device 400 illustrated in FIG. 4B).

At block 702, the method 700 may include emitting, by a light emitter, a light signal that diverges along a fast-axis and a slow-axis.

At block 704, the method 700 may include receiving, by a fast-axis collimation (FAC) lens, the light signal from the light emitter.

At block 706, the method 700 may include reducing, by the FAC lens, a divergence of the received light signal along the fast-axis of the light emitter to provide reduced-divergence light.

At block 708, the method 700 may include receiving, by a transmit lens, the reduced-divergence light. The reduced-divergence light is expanded at the transmit lens.

At block 710, the method 700 may include providing, by the transmit lens, transmit light. The transmit lens may collimate emitted light prior to the light being provided to a surrounding environment (e.g., via a window).

At block 712, the method 700 may include providing the transmit light to an environment via a window that includes a material transparent to the transmit light.

At block 714, the method 700 may include receiving, by a receive lens via the window, reflections of the transmit light from the environment.

At block 716, the method 700 may include providing, by the receive lens, the received reflections to a light sensor.

At block 718, the method 700 may include detecting, by the light sensor, the received reflections.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
a light emitter configured to emit light that diverges along a fast-axis and a slow-axis;
a fast-axis collimation (FAC) lens optically coupled to the light emitter, wherein the FAC lens is configured to receive light emitted by the light emitter and reduce a divergence of the received light along the fast-axis of the light emitter to provide reduced-divergence light;
a transmit lens optically coupled to the FAC lens, wherein the transmit lens is configured to receive the reduced-divergence light from the FAC lens and provide transmit light, and wherein the FAC lens is positioned relative to the light emitter such that the reduced-divergence light is expanded at the transmit lens; and
an optical element comprising a material transparent to the transmit light, wherein the optical element is optically coupled to the transmit lens such that the transmit light from the transmit lens passes through the optical element into a surrounding environment, and
wherein:
the device further comprises a diffusive element disposed on a surface of the FAC lens, wherein the diffusive element adjusts a divergence of the reduced-divergence light; or
the FAC lens is physically attached to the light emitter using an epoxy layer that is transparent to light emitted by the light emitter; or
the device further comprises a slow-axis collimation (SAC) lens configured to reduce a divergence of the reduced-divergence light from the FAC lens along the slow-axis of the light emitter prior to the reduced-divergence light reaching the transmit lens.

2. The device of claim 1, wherein the light emitter comprises a laser diode.

3. The device of claim 1, wherein the light emitter comprises an array of laser diodes.

4. The device of claim 1, wherein the FAC lens comprises an astigmatic lens.

5. The device of claim 4, wherein the astigmatic lens comprises a plano-acylindrical lens.

6. The device of claim 1, further comprising:
a multi-faceted mirror comprising a plurality of reflective facets, wherein the optical element is optically coupled to the transmit lens via the multi-faceted mirror.

7. The device of claim 6,
wherein each of the plurality of reflective facets comprises a transmit portion configured to interact with the transmit light, and
wherein the transmit portion is positioned adjacent to a baffle.

8. The device of claim 6,
wherein the multi-faceted mirror is configured to rotate about a first rotational axis, and
wherein a direction in the environment toward which the transmit light is directed is based on a first angle of the multi-faceted mirror about the first rotational axis.

9. The device of claim 8, further comprising a base,
wherein the light emitter, the FAC lens, and the transmit lens are coupled to the base,
wherein the base is configured to rotate about a second rotational axis, and
wherein the direction in the environment toward which the transmit light is directed is based on a second angle of the base about the second rotational axis.

10. The device of claim 1, wherein the transmit light has a beam size of at least 10 mm² at the optical element.

11. The device of claim 1, wherein the transmit light has a beam size such that less than 50% of the transmit light is occluded by a raindrop on the optical element.

12. The device of claim 1, wherein the device further comprises the diffusive element disposed on the surface of the FAC lens, and wherein the diffusive element adjusts a divergence of the reduced-divergence light.

13. The device of claim 12, wherein the diffusive element comprises a holographic diffuser.

14. The device of claim 12, wherein the diffusive element generates a non-gaussian beam-intensity profile for the reduced-divergence light.

15. The device of claim 1, wherein the FAC lens is physically attached to the light emitter using the epoxy layer that is transparent to light emitted by the light emitter.

16. The device of claim 1, wherein the light emitter and the FAC lens are separated from one another by a distance that is between 80.0% and 99.9% of a separation that would correspond to an optimized collimation along the fast-axis for the reduced-divergence light.

17. The device of claim 1, wherein the device comprises the slow-axis collimation (SAC) lens configured to reduce the divergence of the reduced-divergence light from the FAC lens along the slow-axis of the light emitter prior to the reduced-divergence light reaching the transmit lens.

18. The device of claim 17, wherein a receive face of the SAC lens is separated from a transmit face of the FAC lens by an air gap.

19. An autonomous vehicle comprising:
a device, comprising:
a light emitter configured to emit light that diverges along a fast-axis and a slow-axis;
a fast-axis collimation (FAC) lens optically coupled to the light emitter, wherein the FAC lens is configured to receive light emitted by the light emitter and reduce a divergence of the received light along the fast-axis of the light emitter to provide reduced-divergence light;
a transmit lens optically coupled to the FAC lens, wherein the transmit lens is configured to receive the reduced-divergence light from the FAC lens and provide transmit light, and wherein the FAC lens is positioned relative to the light emitter such that the reduced-divergence light is expanded at the transmit lens; and
an optical element comprising a material transparent to the transmit light, wherein the optical element is optically coupled to the transmit lens such that the transmit light from the transmit lens passes through the optical element into a surrounding environment of the, and
wherein:
the device further comprises a diffusive element disposed on a surface of the FAC lens, wherein the diffusive element adjusts a divergence of the reduced-divergence light; or
the FAC lens is physically attached to the light emitter using an epoxy layer that is transparent to light emitted by the light emitter; or
the device further comprises a slow-axis collimation (SAC) lens configured to reduce a divergence of the reduced-divergence light from the FAC lens along the slow-axis of the light emitter prior to the reduced-divergence light reaching the transmit lens.

20. A method comprising:
emitting, by a light emitter, a light signal that diverges along a fast-axis and a slow-axis;
receiving, by a fast-axis collimation (FAC) lens, the light signal from the light emitter;
reducing, by the FAC lens, a divergence of the received light signal along the fast-axis of the light emitter to provide reduced-divergence light;
receiving, by a transmit lens, the reduced-divergence light, wherein the reduced-divergence light is expanded at the transmit lens;
providing, by the transmit lens, transmit light; and
providing the transmit light to an environment via an optical element comprising a material transparent to the transmit light,
wherein:
the method further comprises adjusting, by a diffusive element disposed on a surface of the FAC lens, a divergence of the reduced-divergence light; or
the FAC lens is physically attached to the light emitter using an epoxy layer that is transparent to light emitted by the light emitter; or
the method further comprises reducing, by a slow-axis collimation (SAC) lens, a divergence of the reduced-divergence light from the FAC lens along the slow-axis of the light emitter prior to the reduced-divergence light reaching the transmit lens.

* * * * *